US008599175B2

(12) United States Patent
Iwata et al.

(10) Patent No.: US 8,599,175 B2
(45) Date of Patent: Dec. 3, 2013

(54) INPUT DETECTION CIRCUIT, INPUT DETECTION METHOD, INPUT DETECTION APPARATUS, AND COMPUTER READABLE MEDIUM

(75) Inventors: Hideki Iwata, Shinagawa (JP); Michiko Endo, Shinagawa (JP); Yuriko Segawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 638 days.

(21) Appl. No.: 12/458,449

(22) Filed: Jul. 13, 2009

(65) Prior Publication Data

US 2010/0006348 A1    Jan. 14, 2010

(30) Foreign Application Priority Data

Jul. 14, 2008 (JP) ................. 2008-183236

(51) Int. Cl.
*G06F 3/041* (2006.01)
(52) U.S. Cl.
USPC ......... 345/179; 345/156; 345/173; 178/18.01
(58) Field of Classification Search
USPC .................. 345/156, 173, 179; 178/18.01
See application file for complete search history.

(56) References Cited

U.S. PATENT DOCUMENTS

| | | | |
|---|---|---|---|
| 5,844,175 A * | 12/1998 | Nakanishi et al. ......... 178/18.03 |
| 6,469,267 B1 | 10/2002 | Welsh et al. |
| 7,075,523 B2 * | 7/2006 | Marten et al. ................ 345/173 |
| 7,158,109 B2 * | 1/2007 | Cairns et al. .................... 345/90 |
| 7,477,242 B2 * | 1/2009 | Cross et al. ................... 345/179 |
| 7,719,367 B2 * | 5/2010 | Krah ................................ 331/18 |
| 8,477,105 B2 * | 7/2013 | Haga et al. .................... 345/173 |
| 2002/0149572 A1 * | 10/2002 | Schulz et al. ................. 345/174 |
| 2003/0043134 A1 * | 3/2003 | Cairns et al. .................. 345/204 |
| 2005/0073507 A1 * | 4/2005 | Richter et al. ................ 345/174 |
| 2006/0017701 A1 * | 1/2006 | Marten et al. ................ 345/173 |
| 2008/0024461 A1 * | 1/2008 | Richter et al. ................ 345/173 |
| 2008/0138589 A1 * | 6/2008 | Wakabayashi et al. ..... 428/195.1 |
| 2008/0157893 A1 * | 7/2008 | Krah .......................... 331/177 R |
| 2008/0238842 A1 * | 10/2008 | Yatabe ............................ 345/87 |
| 2008/0246723 A1 * | 10/2008 | Baumbach .................... 345/156 |
| 2009/0201268 A1 * | 8/2009 | Endo et al. .................... 345/174 |

* cited by examiner

*Primary Examiner* — Bipin Shalwala
*Assistant Examiner* — Afroza Chowdhury
(74) *Attorney, Agent, or Firm* — Staas & Halsey LLP

(57) ABSTRACT

An input detection circuit including: an acquisition portion that acquires at least one potential of a first conductive membrane formed on a first surface of a first substrate, and a second conductive membrane formed on a second surface of a second substrate provided at a position away from the first substrate, the second surface being opposed to the first conductive membrane; a first control portion that controls switches connected to the first conductive membrane or the second conductive membrane to intermittently apply a voltage to the first conductive membrane; and a first detection portion that detects an input operation by detecting the generation of a current that flows from the first conductive membrane to which the voltage is applied by the first control portion, to the second conductive membrane based on the potential acquired by the acquisition portion.

20 Claims, 18 Drawing Sheets

STANDBY TIME
(BEFORE TOUCH INPUT)

STANDBY TIME
(BEFORE TOUCH INPUT)

STANDBY TIME
(BEFORE TOUCH INPUT)

STANDBY TIME
(BEFORE TOUCH INPUT)

STANDBY TIME (BEFORE TOUCH INPUT)

Y-COORDINATE DETECTION TIME

INPUT DETECTION CIRCUIT, INPUT DETECTION METHOD, INPUT DETECTION APPARATUS, AND COMPUTER READABLE MEDIUM

BACKGROUND OF THE INVENTION

1. Field of the Invention

The present invention relates to an input detection circuit, an input detection method, an input detection apparatus, and a computer readable medium that detect an input operation to a touch panel.

2. Description of the Related Art

Conventionally, there has been known a touch panel that can detect an input operation which touch the touch panel with a pen, a finger, or the like (see U.S. Pat. No. 6,469,267).

Especially, a resistive touch panel is composed of two transparent substrate electrodes that are separated by a space and opposed to each other, and a detection circuit that detects contact between the two transparent substrate electrodes. A voltage is applied to one of the two transparent substrate electrodes, so that when one of the two transparent substrate electrodes pressed by the finger comes in contact with another one of the two transparent substrate electrodes, a current is generated between the two transparent substrate electrodes. The touch panel detects the input operation to the touch panel by detecting the generated current. In addition, the touch panel detects an input position where the input operation has been executed, after the detection of the input operation.

In the touch panel described in U.S. Pat. No. 6,469,267, a voltage is always applied between the two transparent substrate electrodes, and hence surfaces of the two transparent substrate electrodes become a state like a capacitor (hereinafter simply referred to as "a capacitor state"). Therefore, when the two transparent substrate electrodes are pressed each other according to the input operation, an inrush current is temporarily generated, to thereby damage the surfaces of the two transparent substrate electrodes. Especially, when a specific part of the touch panel is operated many times, corresponding specific parts of the two transparent substrate electrodes are excessively damaged, and hence the conduction between the two transparent substrate electrodes is obstructed. As a result, it is impossible to detect the input operation.

In the touch panel, the two transparent substrate electrodes are composed of a transparent conductive polymer. Therefore, compared with an indium tin oxide (hereinafter referred to as "an ITO") as a conventional transparent substrate membrane, it is easy for the transparent conductive polymer to receive damage by the inrush current. Especially, in the touch panel, a voltage equal to or less than 1V DC is applied between the two transparent substrate electrodes in order to extend the service life of the two transparent substrate electrodes. Thereby, it is easy for the touch panel to receive the influence of a noise, and the detection accuracy of the input operation does not improve.

Further, this kind of touch panel detects the input position after the detection of the input operation, the voltage equal to or less than 1V DC used for the detection of the input operation is generally used for the actuation of the touch panel. Similarly to this kind of touch panel, it is easy for the touch panel to receive the influence of a noise, and the input position is not detected with higher accuracy (i.e., a resolution is not improved). Especially, in this kind of touch panel, the detection accuracy of the input position reduces according to an increase in an area of the touch panel.

On the other hand, when a power supply circuit supplying a voltage used for the detection of the input operation, and another power supply circuit supplying a voltage used for the detection of the input position are added to this kind of touch panel, an increase in the cost of manufacture is caused by the increases in a power consumption and the number of parts though the detection accuracy of the input position improves certainly.

SUMMARY OF THE INVENTION

It is an object of the present invention to provide an input detection circuit, an input detection method, an input detection apparatus, and a computer readable medium that can prevent an inrush current from being generated by an input operation, and improve detection accuracy of the input operation.

According to an aspect of the present invention, there is provided an input detection circuit including: an acquisition portion that acquires at least one potential of a first conductive membrane formed on a first surface of a first substrate, and a second conductive membrane formed on a second surface of a second substrate provided at a position away from the first substrate, the second surface being opposed to the first conductive membrane; a first control portion that controls switches connected to the first conductive membrane or the second conductive membrane to intermittently apply a voltage to the first conductive membrane; and a first detection portion that detects an input operation by detecting the generation of a current that flows from the first conductive membrane to which the voltage is applied by the first control portion, to the second conductive membrane based on the potential acquired by the acquisition portion.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1:
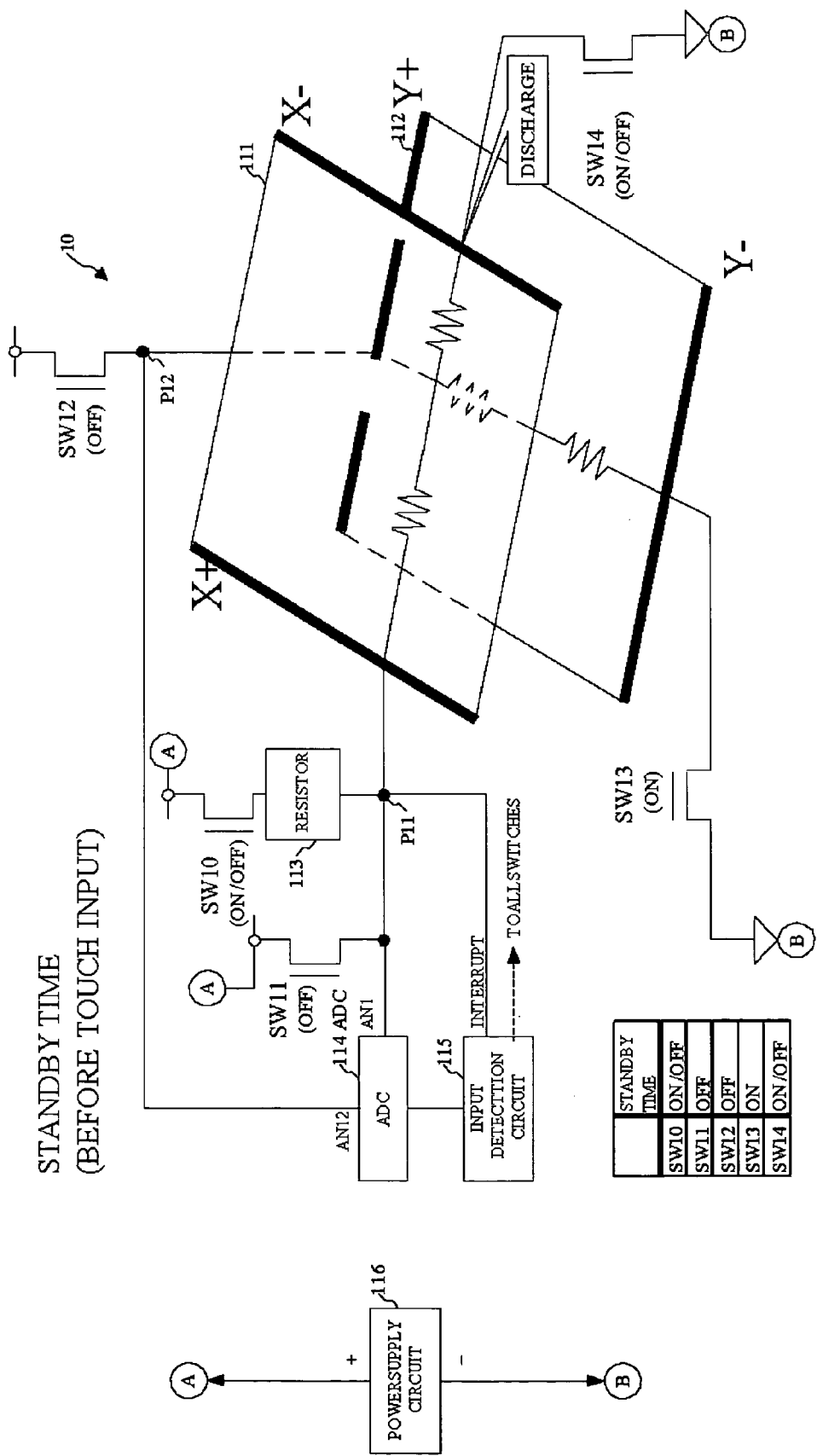
FIG. 1 is a diagram showing an example of the hardware configuration of an input detection apparatus 10 according to a first embodiment.

FIG. 1 is a diagram showing an example of the hardware configuration of an input detection apparatus 10 according to a first embodiment.

The input detection apparatus 10 in FIG. 1 is composed of a 4-lines touch panel, for example. The input detection apparatus 10 detects an operation which inputs information by touch of a panel (hereinafter simply referred to as "an input operation"), and a position where the panel is touched by a pen or a finger in case of the input operation (hereinafter simply referred to as "an input position").

The input detection apparatus 10 includes switches SW10 to SW14, a first substrate electrode 111, a second substrate electrode 112, a resistor 113, an ADC (Analog to Digital Converter) 114, an input detection circuit 115, and a power supply circuit 116.

Each of the switches SW10 to SW14 is composed of a high-speed switching element such as a semiconductor switch. Each of the switches SW10 to SW14 is connected to the input detection circuit 115. Each of the switches SW10 to SW14 is controlled with the input detection circuit 115, and the power supply circuit 116 opens and closes electrical pathways to which electrical power is supplied.

Each of the switches SW10 to SW14 is connected to a positive electrode. The switch SW10 is connected to the resistor 113, the switch SW11 is connected to the first substrate electrode 111, the resistor 113, the ADC 114, and the input detection circuit 115, and the switch SW12 is connected to the second substrate electrode 112, and the ADC 114. Therefore, when the switches SW10 to SW12 close the electrical pathways, voltages by the power supply circuit 116 are applied to the respective electrodes, respective elements, respective circuits, and the like connected to the switches SW10 to SW12.

The switches SW13 and SW14 are connected to a grounded negative electrode of the power supply circuit 116. Further, the switch SW13 is connected to the first substrate electrode 111, and the switch SW14 is connected to the second substrate electrode 112. Therefore, when the switches SW13 and SW14 close the electrical pathways, a reference voltage is supplied to the first substrate electrode 111, and the second substrate electrode 112.

In FIG. 1, the input detection apparatus 10 is in a standby state to wait for the input operation. The case where the input detection device 10 is in the standby state is called input standby time. In the input standby time, the switches SW10 and SW13 are in a state where the electrical pathways are opened, and the switches SW11, SW12, and SW14 are in a state where the electrical pathways are closed.

The first substrate electrode 111 and the second substrate electrode 112 are used by being superimposed on a display surface of a display device such as a CRT (Cathode Ray Tube), an LCD (Liquid Crystal Display), a PDP (Plasma Display Panel), or an organic EL (Electro-Luminescence). Therefore, the first substrate electrode 111 and the second substrate electrode 112 are transparence in general, and are called transparent substrate electrodes.

For example, a user of the input detection device 10 (hereinafter simply referred to as "a user") touches a part which is located right above an image displayed on the display surface, with a finger of the user or a pen (i.e., a so-called touch pen) used by the user, so that the first substrate electrode 111 receives the input operation which inputs information associated with the image. Specifically, the user touches a part which is located right above a button displayed on the display surface, with a finger, so that the first substrate electrode 111 receives the input operation which inputs a command associated with the button.

The first substrate electrode 111 is connected to the switches SW11, SW12, and SW14, the resistor 113, the ADC 114, and the input detection circuit 115. The second substrate electrode 112 is connected to the switches SW12 and SW13, and the ADC 114. The first substrate electrode 111 and the second substrate electrode 112 have panel shapes which are substantively rectangular shapes identical with each other, as viewed from above. The first substrate electrode 111 and the second substrate electrode 112 are located at a given distance, and are arranged in substantively parallel with each other.

The first substrate electrode 111 includes a side having a conductive electrode X+. The first substrate electrode 111 includes a side having a conductive electrode X− opposite to the side having the conductive electrode X+. The conductive electrodes X+ and X− are composed of a silver pattern electrode, for example.

The conductive electrode X+ is connected to the positive electrode of the power supply circuit 116 via the switch SW10 and the resistor 113. Also, the conductive electrode X+ is connected to the positive electrode of the power supply circuit 116 via the switch SW11. Further, the conductive electrode X+ is connected to the ADC 114 and the input detection circuit 115. The conductive electrode X− is connected to the negative electrode of the power supply circuit 116 via the switch SW14.

The second substrate electrode 112 includes a side having a conductive electrode Y+ which is not opposite to the sides having the conductive electrodes X+ and X−. The second substrate electrode 112 includes a side having a conductive electrode Y− opposite to the side having the conductive electrode Y+. Similarly to the conductive electrodes X+ and X−, the conductive electrodes Y+ and Y− are composed of a silver pattern electrode, for example.

The conductive electrode Y+ is connected to the positive electrode of the power supply circuit 116 via the switch SW12. Also, the conductive electrode Y+ is connected to the ADC 114. The conductive electrode Y− is connected to the negative electrode of the power supply circuit 116 via the switch SW13. It should be noted that a given voltage is applied to the conductive electrodes Y+ and Y−, in an X-coordinate detection process that detects an X-coordinate of the input position and a Y-coordinate detection process that detects a Y-coordinate of the input position.

Figure 2A:
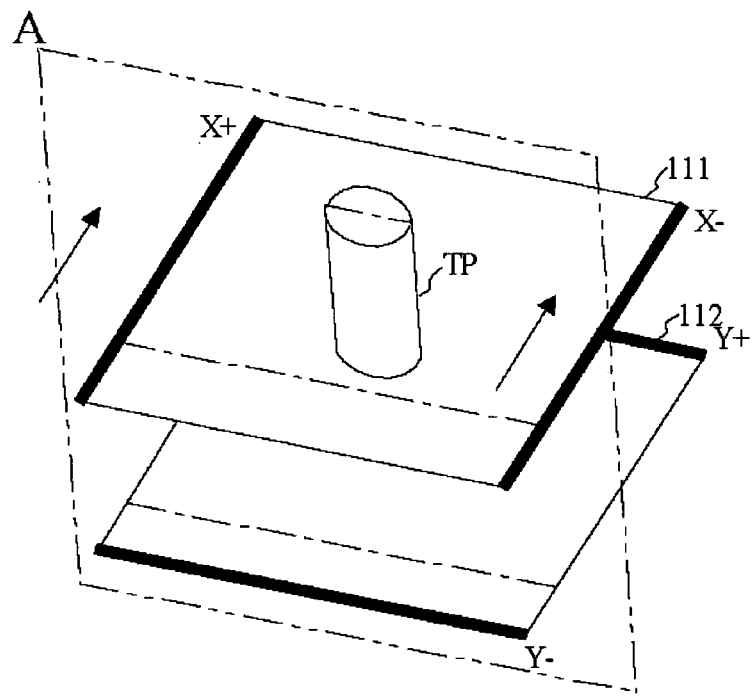
FIG. 2A is a fragmentary enlarged diagram showing a first substrate electrode 111 and a second substrate electrode 112 shown in FIG. 1.

FIG. 2A is a fragmentary enlarged diagram showing the first substrate electrode 111 and the second substrate electrode 112 shown in FIG. 1. FIG. 2A shows the first substrate electrode 111 and the second substrate electrode 112 before touch input. The "before touch input" indicates a time point before the user executes the input operation with a touch pen TP, in the input standby time. Touch input time indicates a time point when the user executes the input operation in the input standby time.

Figure 2B:
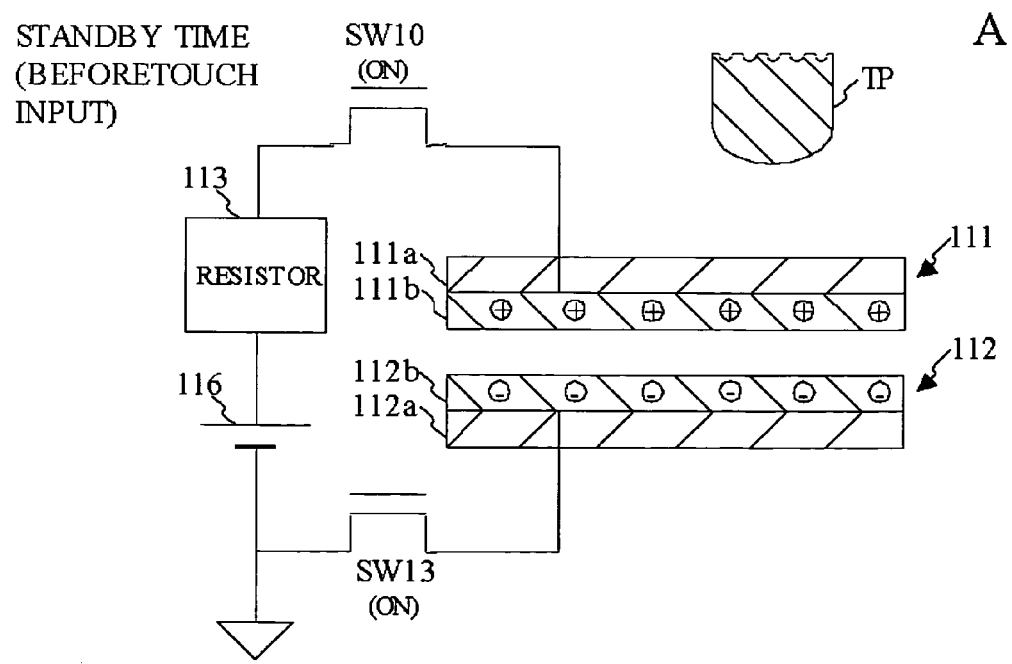
FIG. 2B is a cross-section diagram when the first substrate electrode 111 and the second substrate electrode 112 are cut off at a cutting section "A"

FIG. 2B is a cross-section diagram when the first substrate electrode 111 and the second substrate electrode 112 are cut off at a cutting section "A". The first substrate electrode 111 in FIG. 2B is composed of a first substrate 111a and a first conductive membrane 111b. The second substrate electrode 112 in FIG. 2B is composed of a second substrate 112a and a second conductive membrane 112b. The configuration of the first substrate electrode 111 is identical with that of the second substrate electrode 112, and hence a description will be mainly given of the first substrate electrode 111.

The first substrate 111a is composed of polycarbonate, acrylic, polyethylene terephthalate (PET), glass, or the like, for example. Also, the second substrate 112a is composed of polycarbonate, acrylic, polyethylene terephthalate (PET), glass, or the like, for example. The second substrate 112a is provided at a position away from the first substrate 111a. The first substrate 111a is not limited to the same material as the second substrate 112a. The first conductive membrane 111b is a conductive membrane formed on a surface of the first substrate 111a. The second conductive membrane 112b is a conductive membrane formed on a surface of the second substrate 112a opposed to the first conductive membrane 111b.

At least one of the first conductive membrane 111b and the second conductive membrane 112b is composed of a transparent conductive polymer. Since the transparent conductive polymer has flexibility and decay durability, and is a low cost, the detection accuracy of the input operation can be improved for a long term, and the cost of manufacturing of the input detection apparatus 10 can be reduced.

The transparent conductive polymer is composed of a conductive polymer material in a polythiophene system. With the configuration, it is possible to prevent a conductive capability of the conductive polymer material in the polythiophene system from being lost by the inrush current.

Especially, in the conductive polymer material in the polythiophene system, the conduction is hindered by the inrush current. Therefore, even when a specific part of the first substrate electrode 111 is operated many times by the input operation, the damage probability in the specific parts of the first conductive membrane 111b and the second conductive membrane 112b can be reduced. As a result, the conduction between the electrodes can be maintained over a long period of time, and the input operation can be detected over a long period of time.

The first conductive membrane 111b is connected to the positive electrode of the power supply circuit 116 via the conductive electrode X+, and the switches SW10 and SW11 (not shown), and connected to the negative electrode of the power supply circuit 116 via the conductive electrode X−, and the switch SW14. The second conductive membrane 112b is connected to the positive electrode of the power supply circuit 116 via the conductive electrode Y+, and the switch SW12, and connected to the negative electrode of the power supply circuit 116 via the conductive electrode Y−, and the switch SW13.

Referring again to FIG. 1, the resistor 113 is composed of a metal coating resistance, for example, and connected to the switch SW10, the first substrate electrode 111, the ADC 114, and the input detection circuit 115. The resistor 113 limits an amount of the current that flows from the switch SW10 to the first substrate electrode 111.

The ADC 114 is connected to the first substrate electrode 111, the second substrate electrode 112, the input detection circuit 115, the switches SW11 and SW12, and the resistor 113.

The ADC 114 converts an electrical potential AN1 of the conductive electrode X+ included in the first substrate electrode 111 and an electrical potential AN2 of the conductive electrode Y+ included in the second substrate electrode 112 into digital values, and outputs the digital values to the input detection circuit 115.

Especially, in time of coordinate detection, the AD 114 detects electrical potentials of contact points PT1 and PT2 of the first conductive membrane 111b and the second conductive membrane 112b. The time of coordinate detection indicates a time point when the input detection circuit 115 detects coordinates of the input position. With respect to coordinate axes, an axis of the conductive electrode X+ is set as an X-axis, and an axis of the conductive electrode Y+ is set as a Y-axis. The time of coordinate detection is classified into the X-coordinate detection time when the input detection circuit 115 detects the X-coordinate of the input position, and the Y-coordinate detection time when the input detection circuit 115 detects the Y-coordinate of the input position.

The power supply circuit 116 is composed of a power supply integrated circuit (IC). The positive electrode of the power supply circuit 116 is connected to the switches SW10 to SW12, and the negative electrode of the power supply circuit 116 is connected to the switches SW13 and SW14. The negative electrode of the power supply circuit 116 is grounded.

The input detection circuit 115 is connected to the first substrate electrode 111, the resistor 113, the ADC 114, and the switches SW10 and SW14. The input detection circuit 115 executes an input detection process as a software process. Also, the input detection circuit 115 controls opening and closing of the switches SW10 to SW14, and detects the input operation and the input position.

Figure 3:
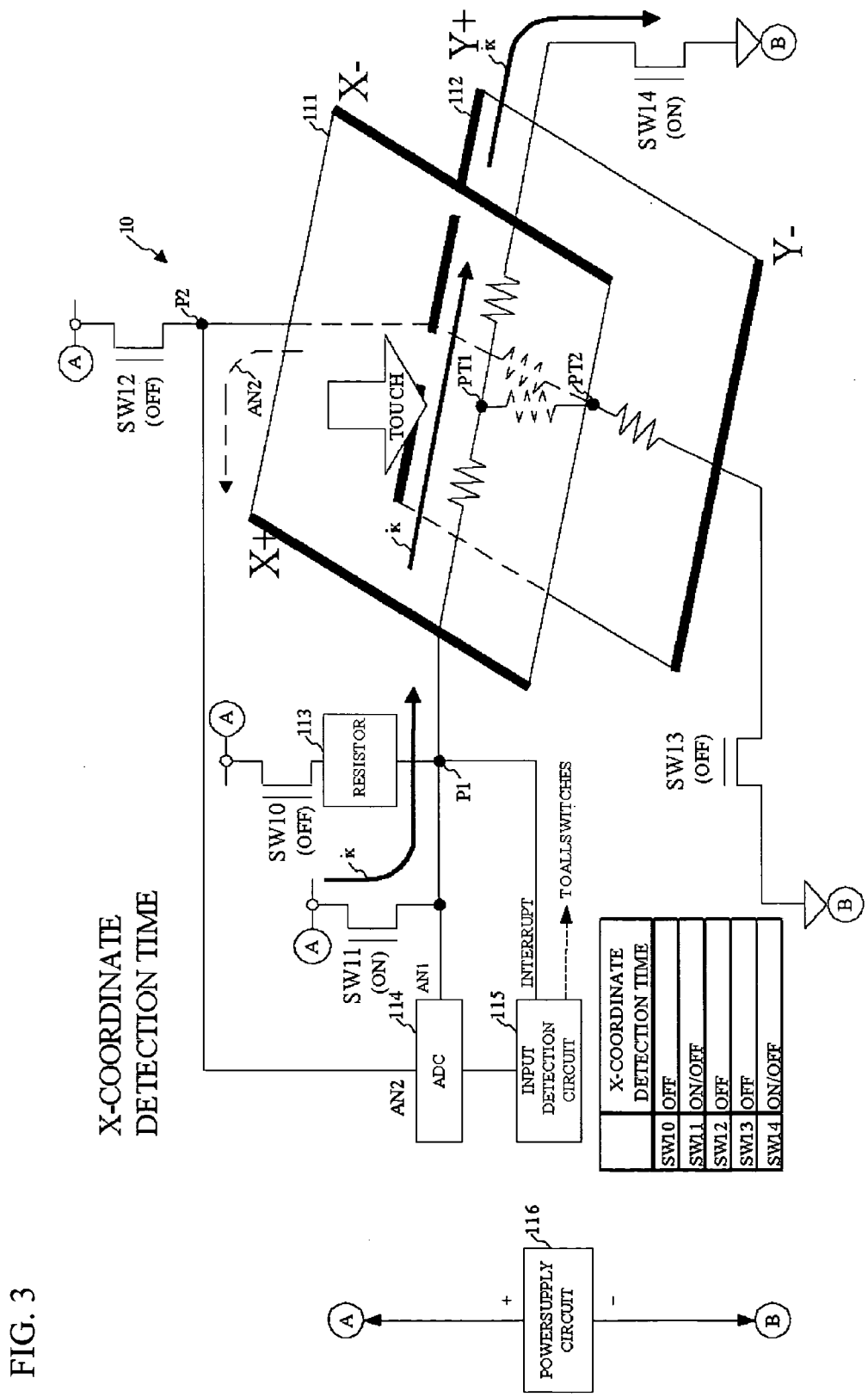
FIG. 3 is a diagram showing an example of a current generated by the input detection apparatus 10 shown in FIG. 1 in X-coordinate detection time.

FIG. 3 is a diagram showing an example of a current generated by the input detection apparatus 10 shown in FIG. 1 in the X-coordinate detection time.

As shown in FIG. 3, the switches SW10, SW12, and SW13 close the electrical pathways in the X-coordinate detection time. The switches SW11 and SW14 open the electrical pathways. Thereby, a current ix generated in the X-coordinate detection time flows from the positive electrode of the power supply circuit 116 to the conductive electrode X− via the switch SW11 opening an electrical pathway, and the conductive electrode X+. The current ix passes the contact point PT1 located between the conductive electrodes X+ and X−, and flows to the negative electrode of the power supply circuit 116 via the switch SW14. The first conductive membrane 111b from the conductive electrode X+ to the conductive electrode X− becomes a constant electrical potential distribution.

Here, the current does not flow to the second substrate electrode 112, and hence the potential of a point P2 is the same as that of the contact point PT2. Therefore, the ADC 114 acquires the potential of the contact point PT1 and the potential AN2 of the contact point PT2 from the electrical pathway passing the point P2. In this case, the contact point PT1 comes in contact with the contact point PT2, and hence the potential of the contact point PT1 is the same as that of the contact point PT2. The input detection apparatus 10 detects the X-coordinate of the input position by using the potentials of the conductive electrodes X+ and X−, and the potential of the contact point PT1 (i.e., potential AN2).

Figure 4:
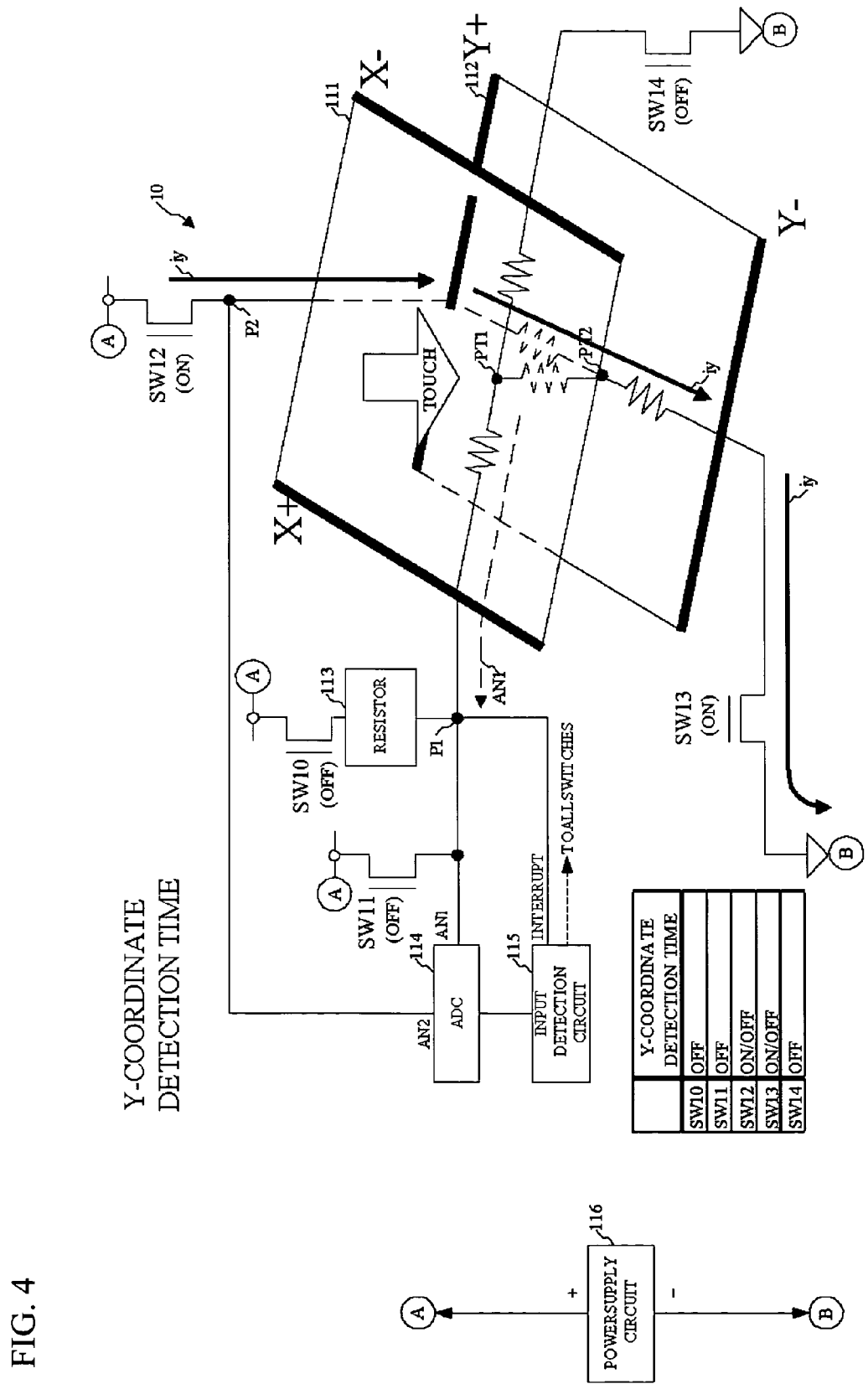
FIG. 4 is a diagram showing an example of a current generated by the input detection apparatus 10 shown in FIG. 1 in Y-coordinate detection time.

FIG. 4 is a diagram showing an example of a current generated by the input detection apparatus 10 shown in FIG. 1 in Y-coordinate detection time.

As shown in FIG. 4, the switches SW10, SW11, and SW14 close the electrical pathways in the Y-coordinate detection time. The switches SW12 and SW13 open the electrical pathways. Thereby, a current iy generated in the Y-coordinate detection time flows from the positive electrode of the power supply circuit 116 to the conductive electrode Y− via the switch SW12 opening an electrical pathway, and the conductive electrode Y+. The current iy passes the contact point PT2 located between the conductive electrodes Y+ and Y−, and flows to the negative electrode of the power supply circuit 116 via the switch SW13. The second conductive membrane 112b from the conductive electrode Y+ to the conductive electrode Y− becomes a constant electrical potential distribution.

Here, similarly to the X-coordinate detection time, the ADC 114 acquires the potential of the contact point PT2 and the potential AN1 of the contact point PT1 from the electrical pathway passing the point P2. In this case, the contact point PT1 comes in contact with the contact point PT2, and hence the potential of the contact point PT2 is the same as that of the contact point PT1. The input detection apparatus 10 detects the Y-coordinate of the input position by using the potentials of the conductive electrodes Y+ and Y−, and the potential of the contact point PT2 (i.e., potential AN1).

In the above configuration, a voltage, which the power supply circuit 116 applies to the first substrate electrode 111 and the second substrate electrode 112 and is used for detecting the input operation, is used for detecting the coordinates of the input position.

Figure 5:
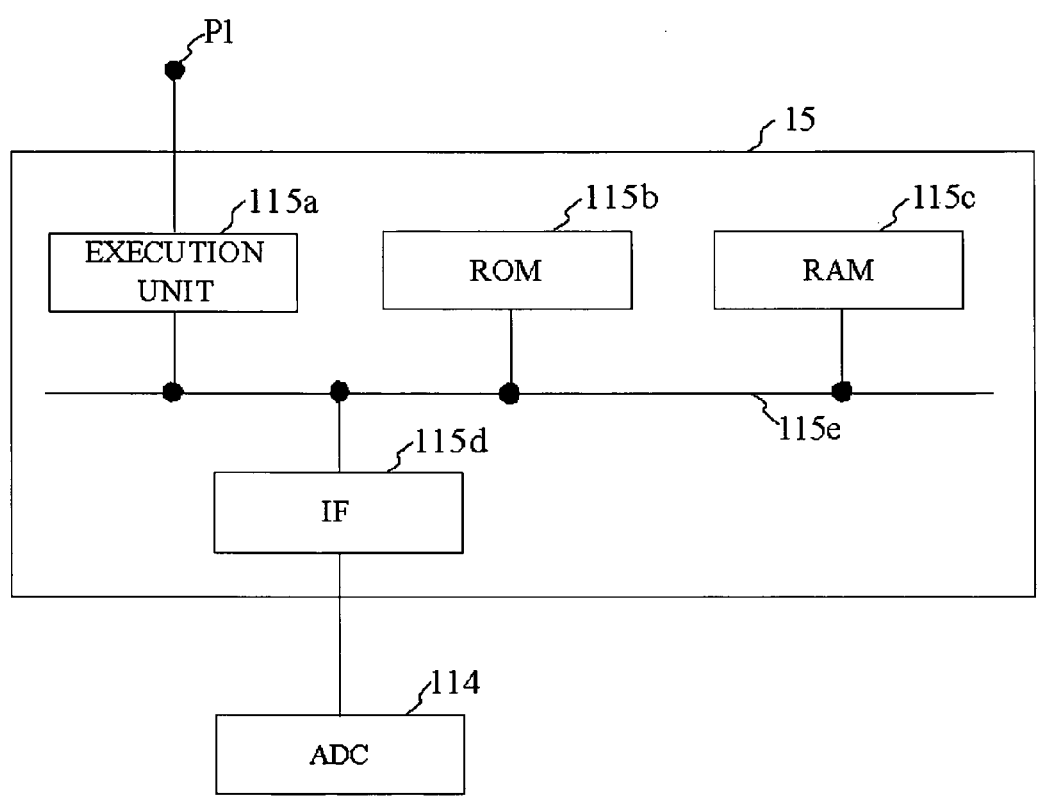
FIG. 5 is a diagram showing an example of the hardware configuration of an input detection circuit 115.

FIG. 5 is a diagram showing an example of the hardware configuration of the input detection circuit 115.

The input detection circuit 115 includes: an execution unit 115a such as a CPU (Central Processing Unit); a ROM (Read-Only Memory) 115b such as an EPROM (Erasable Programmable Read-Only Memory), or an EEPROM (Electrically Erasable Programmable Read-Only Memory); a RAM 115c (Random Access Memory) composed of a volatile memory such as a DRAM (Dynamic RAM) or a SRAM (Static RAM), and a non-volatile memory such as a NVRAM (Non Volatile RAM); and a IF (interface) unit 115d composed of a peripheral circuit executing the input and the output. The execution unit 115a, the ROM 115b, the RAM 115c, and the IF unit 115d are connected to each other by a bus 115e. The execution unit 115a has an interruption line. The execution unit 115a executes a given interruption process according to the change of a potential (i.e., a level) of the interruption line as a trigger.

The execution unit 115a reads out a program stored into the ROM 115b, and executes an operation according to the read-out program, so that the software process is achieved. Data on the result of the operation is written in the RAM 115c, and data for which backup is necessary at the power-off is especially stored in the NVRAM. The IF unit 115d inputs and outputs a value to be operated, and the result of the operation from/to the external ADC 114.

Figure 6:
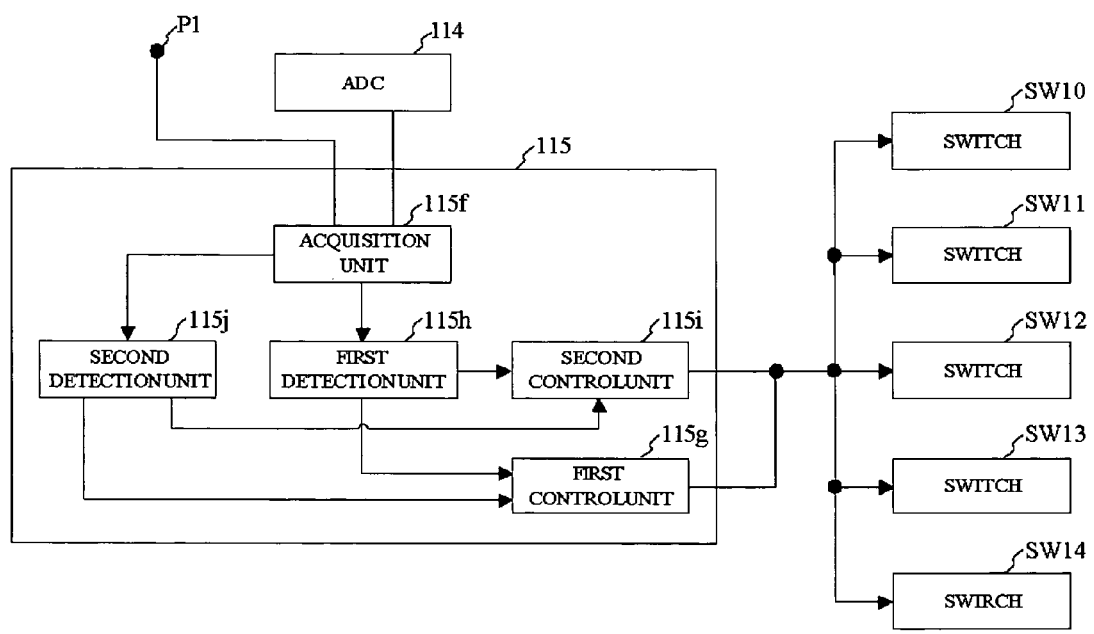
FIG. 6 is a functional block diagram showing an example of the configuration of the input detection circuit 115.

FIG. 6 is a functional block diagram showing an example of the configuration of the input detection circuit 115.

The input detection circuit 115 includes an acquisition unit 115f, a first control unit 115g, a first detection unit 115h, a second control unit 115i, and a second detection unit 115j. The first control unit 115g, the first detection unit 115h, the second control unit 115i, and the second detection unit 115j are achieved by the execution unit 115a.

The acquisition unit 115f is achieved by the IF unit 115d, or the input detection circuit 115 executing an acquisition process described hereinafter.

The acquisition unit 115f is connected to the ADC 114, the first detection unit 115h, the second detection unit 115j, and a point P1 via the interruption line. The acquisition unit 115f acquires the potential of the first conductive membrane 111b connected to the interruption line via the point P1. The acquisition unit 115f acquires the potential AN1 of the first conductive membrane 111b and the potential AN2 of the second conductive membrane 112b from the ADC 114. In the coordinate detection time, the acquisition unit 115f especially acquires the potentials of the contact points PT1 and PT2 of the first conductive membrane 111b and the second conductive membrane 112b from the ADC 114.

In an initial state where the input detection circuit 115 starts, and in a time period after the second detection unit 115j detects the input position and until the first detection unit 115h detects the input, the input detection circuit 115 becomes the standby state in the present embodiment. The standby state is not limited to this.

The first detection unit 115h is connected to the acquisition unit 115f, the first control unit 115g, and the second control unit 115i. The first detection unit 115h may be achieved by the input detection circuit 115 executing a first detection process, described hereinafter. When the level acquired from the interruption line by the acquisition unit 115f reduces to a low level, the first detection process is executed with the input detection circuit 115 as an interruption process. However, the first detection process is not limited to this. For example, in the first detection process, the first detection unit 115h monitors the potential AN1 acquired by the acquisition unit 115f at given intervals. When the potential to be monitored reduces, the first detection unit 115h may detect the generation of a current flowing from the first conductive membrane 111b to the second conductive membrane 112b. When the first detection unit 115h detects the generation of the current, the first detection unit 115h detects the input operation.

For example, when the first detection unit 115h detects the generation of the current continuously two times or more, the first detection unit 115h may detect the input operation. With the configuration, when the current flowing from the first conductive membrane 111b to the second conductive membrane 112b is detected continuously two times or more, the input operation is detected. Therefore, the detection accuracy of the input operation can be improved.

Moreover, when the current is detected more than a given value during a given time period, the first detection unit 115h may detect the input operation. The given value is decided by the number of times in which the first control unit 115g applies a voltage to the first conductive membrane 111b. With the configuration, when the current flowing from the first conductive membrane 111b to the second conductive membrane 112b is detected more than the given value during the given time period, the input operation is detected. Therefore, the detection accuracy of the input operation can be improved.

The second control unit 115i is connected to the first detection unit 115h, the second detection unit 115j, and the switches SW10 to SW14. The second control unit 115i may be achieved by the input detection circuit 115 executing a second control process, described hereinafter. In the coordinate detection time, the second control unit 115i applies the same voltage as the standby state by using the power supply circuit 116, to the conductive electrode X+ of the first conductive membrane 111b and the conductive electrode Y+ of the second conductive membrane 112b.

Specifically, in the X-coordinate detection time, the second control unit 115i controls the switches SW10, SW12, and SW13 to close the electrical pathways, and controls the switches SW11 and SW14 such that the switches SW11 and SW14 synchronize mutually, and simultaneously and intermittently open the electrical pathways. The second control unit 115i controls the switches SW11 and SW14 to intermittently open the electrical pathways whereby a consumed electric power is reduced. Also, in the Y-coordinate detection time, the second control unit 115i controls the switches SW10, SW11, and SW14 to close the electrical pathways, and controls the switches SW12 and SW13 such that the switches SW12 and SW13 synchronize mutually, and simultaneously and intermittently open the electrical pathways.

The second control unit 115i controls the power supply circuit 116 to apply the voltage to any one of the first conductive membrane 111b and the second conductive membrane 112b.

The second detection unit 115j is connected to the acquisition unit 115f, the first control unit 115g, and the second control unit 115i. The second detection unit 115j may be achieved by the input detection circuit 115 executing a second detection process, described hereinafter. The second detection unit 115j detects coordinate values of the input position based on the potentials AN1 and AN2 of the contact point PT1 and PT2 which are acquired by the acquisition unit 115f and are decided by the voltages applied to the first conductive membrane 111b and the second conductive membrane 112b by the second control unit 115i. Thereby, the input position is detected by using the voltages applied to the first conductive membrane 111b and the second conductive membrane 112b, and hence the detection accuracy of the input position can be improved.

Specifically, the second detection unit 115j detects the X-coordinate of the input position based on a potential difference between the conductive electrodes X+ and X−, and the potential AN2 of the contact point PT2 substantively equal to the potential of the contact point PT1. Similarly, the second detection unit 115j also detects the Y-coordinate of the input position.

In the input standby time, the first control unit 115g executes the first control process in which the first control unit 115g controls the power supply circuit 116 to intermittently apply the voltage to the first conductive membrane 111b included in the first substrate electrode 111. Specifically, in the input standby time, the first control unit 115g controls the switches SW11 and SW12 to close the electrical pathways, and controls the switch SW13 to open the electrical pathway. In addition, the first control unit 115g controls the switches SW10 and SW14 to intermittently open the electrical pathways.

Figure 7A:
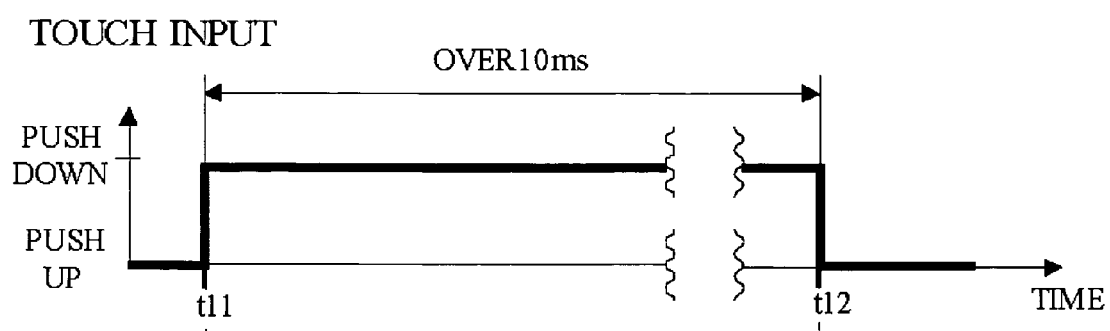
FIG. 7A is a diagram showing timing in which a touch pen comes in contact with the first substrate electrode 111 by an input operation.
Figure 7B:
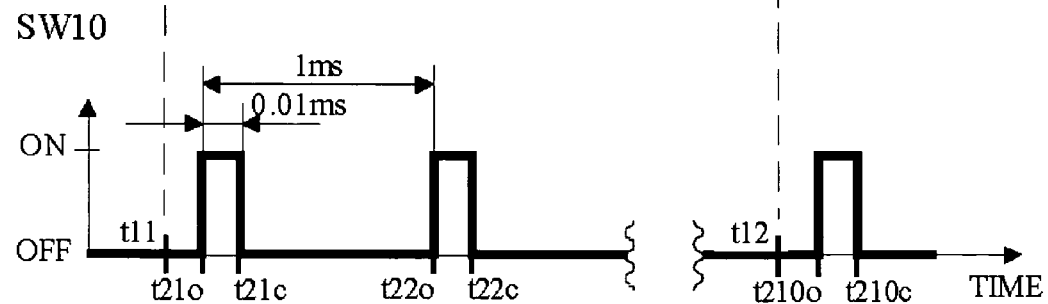
FIG. 7B is a diagram showing timing in which a first control unit 115g controls a switch SW10.
Figure 7C:
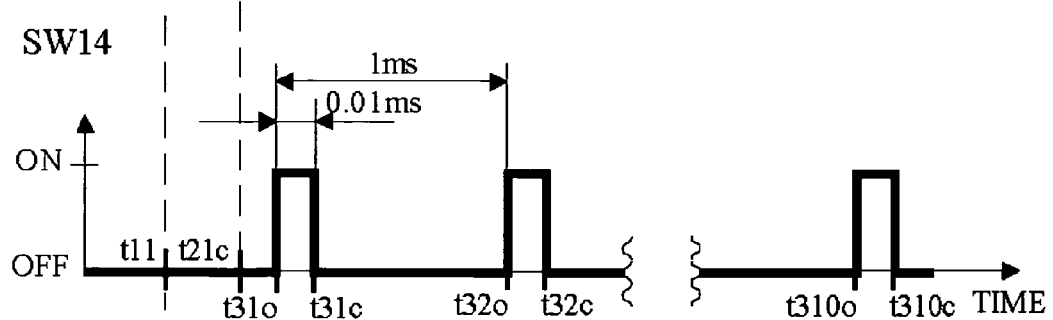
FIG. 7C is a diagram showing timing in which a first control unit 115g controls a switch SW14.

Here, a description will be given of control timing in which the first control unit 115g controls the switches SW10 and SW14, with reference to FIGS. 7A to 7C. FIGS. 7A to 7C show the control timing in which the first control unit 115g controls the switches SW10 and SW14.

FIG. 7A is a diagram showing timing in which the touch pen TP1 comes in contact with the first substrate electrode 111 (hereinafter simply referred to as "touch input") by an input operation. In FIG. 7A, the touch pen TP1 starts to touch the first substrate electrode 111 at time t11 (i.e., start of the touch input). At time t12, the touch pen TP1 is separated from the first substrate electrode 111 (i.e., end of the touch input). Thus, the touch input is executed during 10 ms in FIG. 7A.

FIG. 7B is a diagram showing timing in which the first control unit 115g controls the switch SW10. In FIG. 7B, the first control unit 115g controls the switch SW10 to open the electrical pathway during 0.01 ms, at intervals of 1 ms. At times t21o to t210o, the first control unit 115g controls the switch SW10 to open the electrical pathway. At times t21c to t210c, the first control unit 115g controls the switch SW10 to close the electrical pathway.

FIG. 7C is a diagram showing timing in which the first control unit 115g controls the switch SW14. Similarly to FIG. 7B, in FIG. 7C, the first control unit 115g controls the switch SW14 to open the electrical pathway during 0.01 ms, at intervals of 1 ms. At times t31o to t310o, the first control unit 115g controls the switch SW14 to open the electrical pathway. At times t31c to t310c, the first control unit 115g controls the switch SW14 to close the electrical pathway. The times t31o to t310o in FIG. 7C are later than the times t21o to t210o in FIG. 7B, respectively. The times t31c to t310c in FIG. 7C are faster than the times t22o to t211o (not shown) in FIG. 7B, respectively.

Figure 8A:
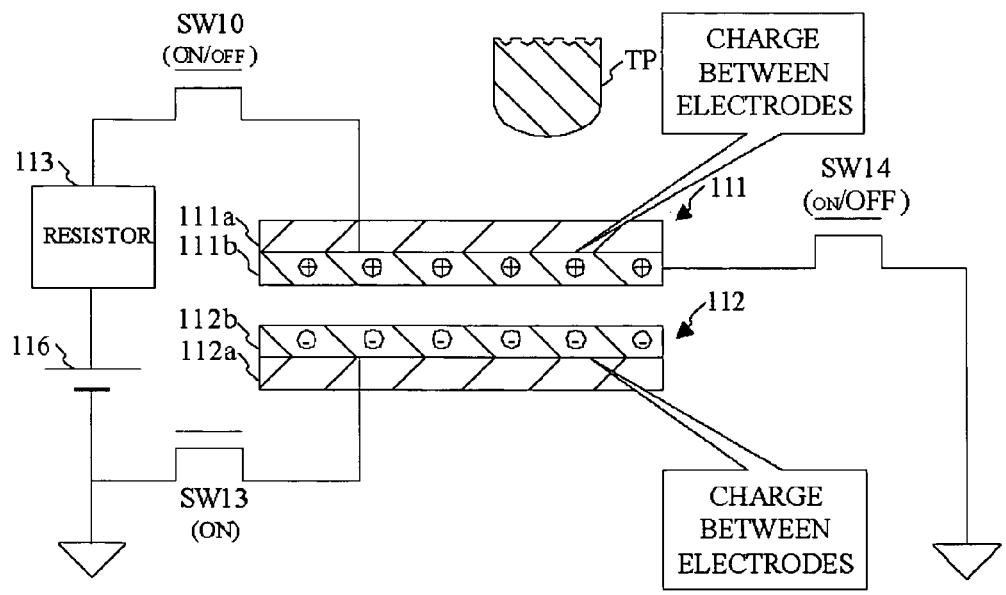
FIG. 8A is a diagram showing an example of electrical charges accumulated in the first substrate electrode 111, according to the control of the first control unit 115g from time t21o to time t21c as shown in FIG. 7B.
Figure 8B:
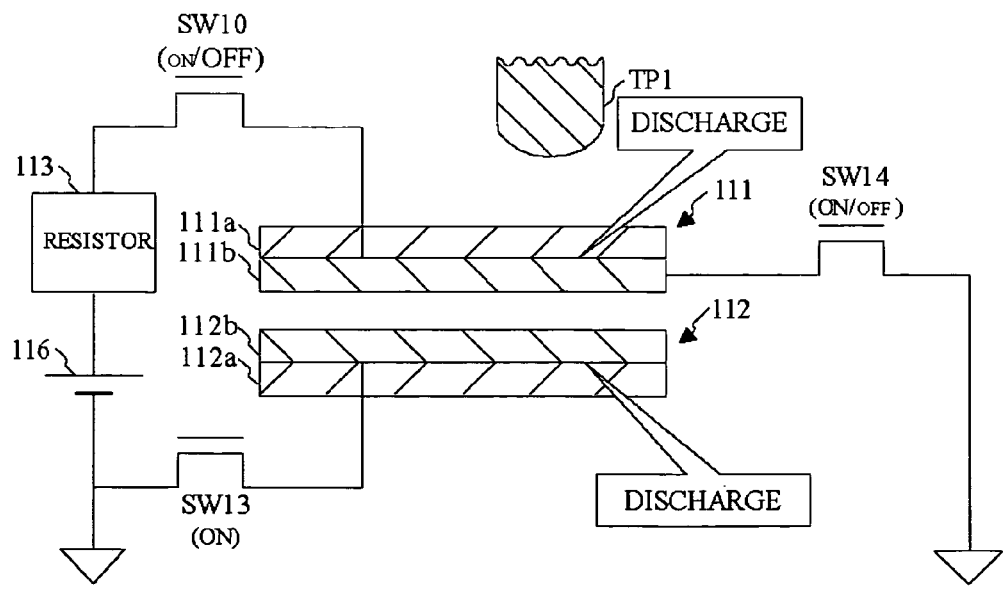
FIG. 8B is a diagram showing an example of electrical charges accumulated in the first substrate electrode 111, according to the control of the first control unit 115g from time t31o to time t31c as shown in FIG. 7C.

FIGS. 8A and 8B show an example of electrical charges accumulated in the first substrate electrode 111 before the touch input.

FIG. 8A is a diagram showing an example of electrical charges accumulated in the first substrate electrode 111, according to the control of the first control unit 115g from time t21o to time t21c as shown in FIG. 7B. The control of the first control unit 115g indicates a control in which the switch SW10 opens the electrical pathway, and a control in which the switch SW14 closes the electrical pathway. In the first conductive membrane 111b and the second conductive membrane 112b in FIG. 8A, positive electrical charges are accumulated in the surface of the first conductive membrane 111b, and negative electrical charges are accumulated in the surface of the second conductive membrane 112b.

FIG. 8B is a diagram showing an example of electrical charges accumulated in the first substrate electrode 111, according to the control of the first control unit 115g from time t31o to time t31c as shown in FIG. 7C. The control of the first control unit 115g indicates a control in which the switch SW10 closes the electrical pathway, and a control in which the switch SW14 opens the electrical pathway. The first conductive membrane 111b and the second conductive membrane 112b in FIG. 8A are connected to the grounded negative electrode of the power supply circuit 116 via the switches SW13 and SW14 opening the electrical pathways. Therefore, the positive electrical charges accumulated in the surface of the first conductive membrane 111b, and the negative electrical charges accumulated in the surface of the second conductive membrane 112b are discharged.

Figure 9A:
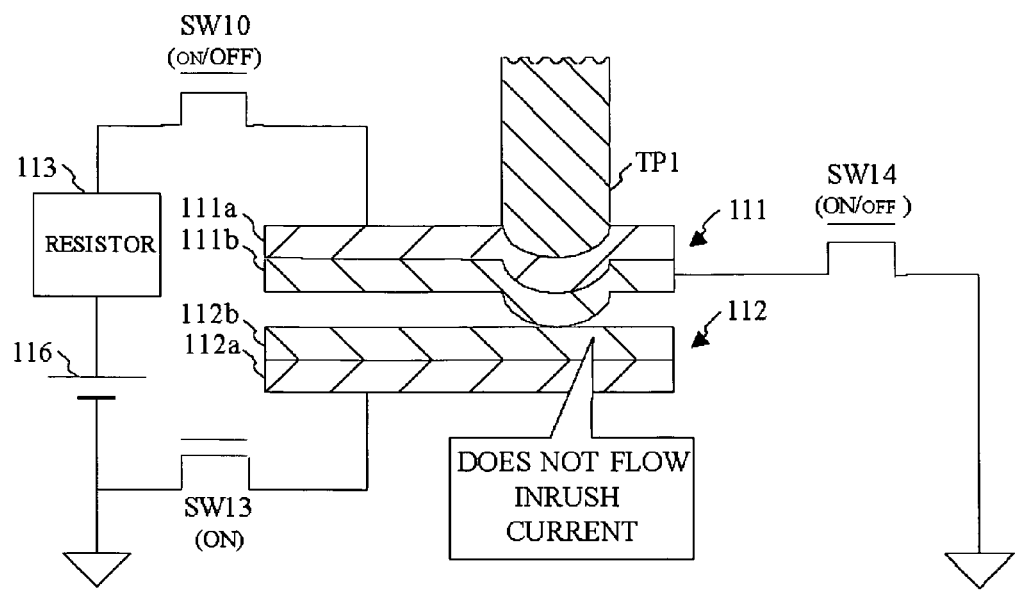
FIG. 9A is a diagram showing an example of a current generated by the first substrate electrode 111 and the second substrate electrode 112, at start time t11 of a touch input shown in FIG. 7A.
Figure 9B:
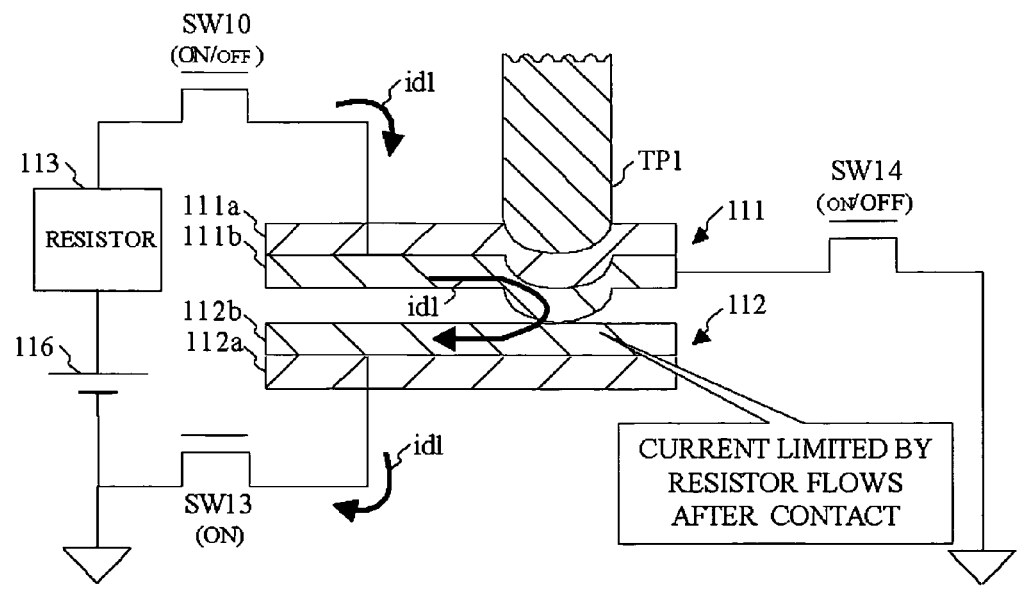
FIG. 9B is a diagram showing an example of a current generated by the first substrate electrode 111 and the second substrate electrode 112, at the time t21o (i.e., time in which the switch SW10 is on) after the start time t11 of the touch input shown in FIG. 7B.

FIGS. 9A and 9B show examples of a current generated by the first substrate electrode 111 and the second substrate electrode 112 in the touch input time.

FIG. 9A is a diagram showing an example of a current generated by the first substrate electrode 111 and the second substrate electrode 112, at start time t11 of the touch input shown in FIG. 7A. The first conductive membrane 111b and the second conductive membrane 112b in FIG. 9A discharges the positive and negative electrical charges by the control as described in FIG. 8B. Therefore, even when the first conductive membrane 111b comes in contact with the second conductive membrane 112b by the start of the touch input, the inrush current is not generated.

FIG. 9B is a diagram showing an example of a current generated by the first substrate electrode 111 and the second substrate electrode 112, at the time t21o (i.e., time in which the switch SW10 is on) after the start time t11 of the touch input shown in FIG. 7B. In the first conductive membrane 111b and the second conductive membrane 112b in FIG. 9B, a current id1, an amount of which is limited with the resistor 213 is generated. The first detection unit 115h detects the input operation by detecting the generation of the current id1.

The first control process executed by the first control unit 115g indicates that the first control unit 115g controls the power supply circuit 116 to apply a voltage having a pulse width of 0.01 ms in the frequency of 1 KHz to the first conductive membrane 111b. That is, in the first control process, the voltage whose duty ratio is 1% is applied to the first conductive membrane 111b.

With the configuration, the voltage is intermittently applied to the first conductive membrane 111b, and hence the probability of generation of the inrush current is reduced when the first conductive membrane 111b comes in contact with the second conductive membrane 112b. Therefore, the detection accuracy of the input operation can be improved by an increase in the applied voltage. Also, with the configuration, when the voltage is applied to the first conductive membrane 111b, the probability in which the first conductive membrane 111b comes in contact with the second conductive membrane 112b becomes equal to or less than 1%, and hence the probability of generation of the inrush current also becomes equal to or less than 1%. In addition, the probability of generation of the inrush current also becomes equal to or less than 1%, so that the damage probability of the first conductive membrane 111b and the second conductive membrane 112b by the inrush current becomes equal to or less than 1%. Thereby, the service life of the first conductive membrane 111b and the second conductive membrane 112b improves by two digits or more.

As described above, the first conductive membrane 111b and the second conductive membrane 112b are connected to the negative electrode of the power supply circuit 116 via the switches SW14 and SW13 opening the electrical pathways. Therefore, after the voltage is applied to the first conductive membrane 111b, the first control unit 115g sets the potentials of the first conductive membrane 111b and the second conductive membrane 112b to a reference potential. With the configuration, the probability of generation of the inrush current can be reduced accurately.

It is desirable that, in the first control process executed by the first control unit 115g, a voltage having a pulse width of 10 ms or less in the frequency of 100 MHz or more is applied to the first conductive membrane 111b. It is also desirable that, in the first control process executed by the first control unit 115g, a voltage having a pulse width of 0.001 ms or more in the frequency of 10 KHz or less is applied to the first conductive membrane 111b. However, the applied voltages are not limited to these. A voltage having a pulse width of 0.001 ms or less in the frequency of 10 KHz or more may be applied to the first conductive membrane 111b, depending on a capability in which the input detection circuit 115 detects the changes of the potentials AN1 and AN2. With the configuration, the input operation can be detected with certainty and high accuracy. Especially, as shown in FIG. 7A, the normal input operation is executed during 10 ms or more, the detection accuracy of the input operation is notably improved in the time period.

Figure 10:
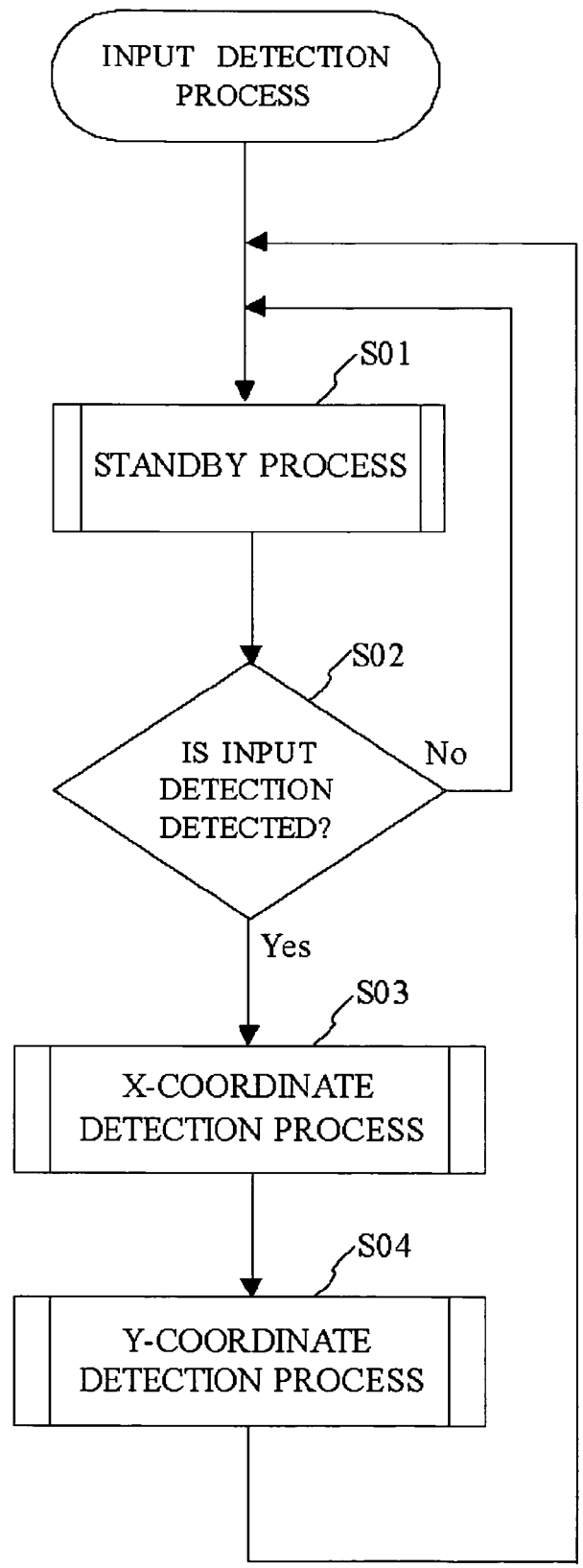
FIG. 10 is a flowchart showing an example of an input detection process executed with the input detection circuit 115.

FIG. 10 is a flowchart showing an example of the input detection process executed with the input detection circuit 115.

The input detection circuit 115 executes a standby process that waits for the input operation (step S01). Next, the input detection circuit 115 determines whether the input operation is detected (step S02). When the answer to the determination of step S02 is "YES", the procedure proceeds to step S03. When the answer to the determination of step S02 is "NO", the procedure returns to step S01, and the procedures of steps S01 and S02 are repeated.

When the answer to the determination of step S02 is "YES", the input detection circuit 115 executes the X-coordinate detection process that detects the X-coordinate of the input position (step S03). Next, the input detection circuit 115 executes the Y-coordinate detection process that detects the Y-coordinate of the input position (step S04). Then, the procedure returns to step S01, and the input detection circuit 115 repeats the present process.

Figure 11:
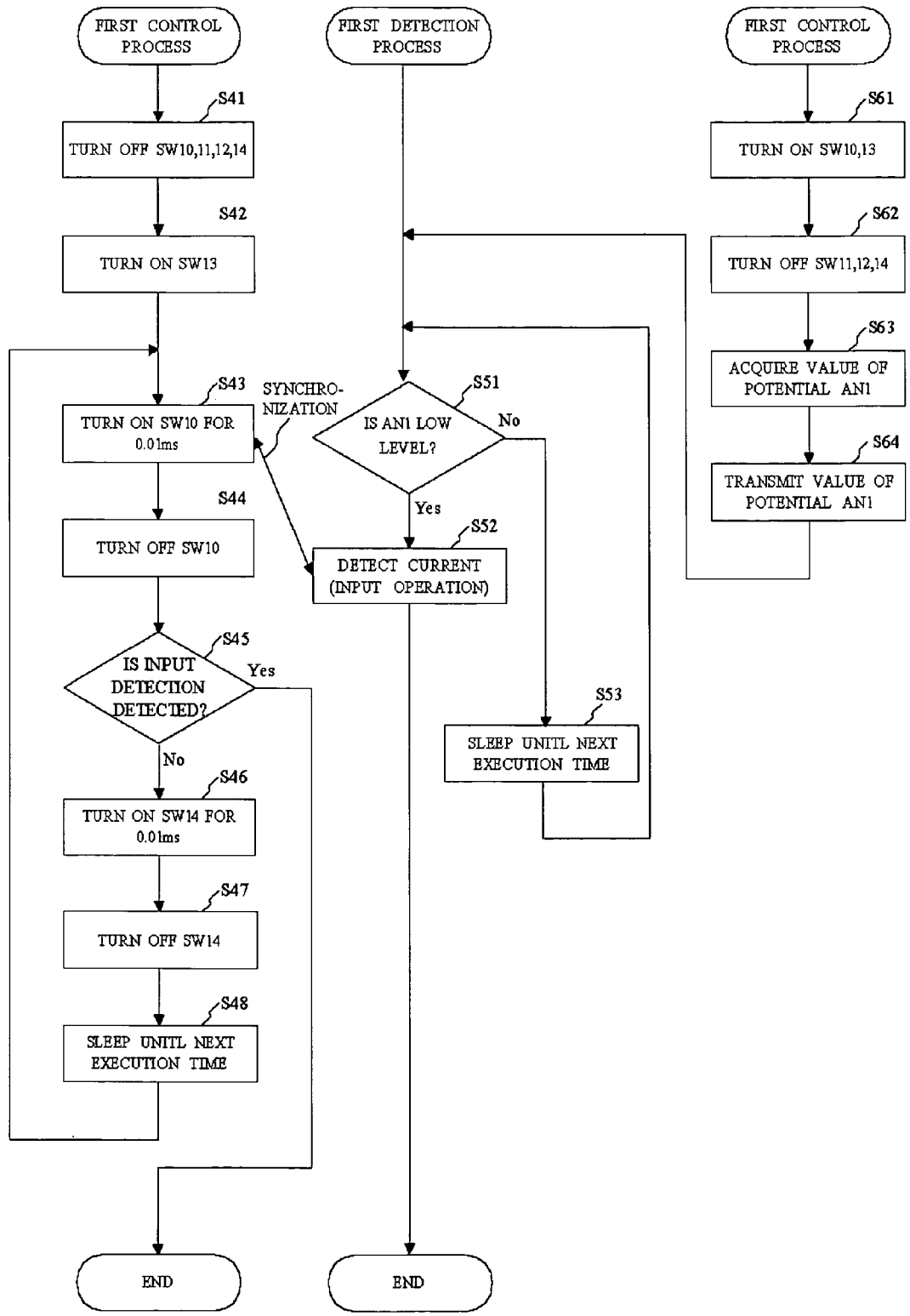
FIG. 11 is a flowchart showing an example of a standby process of step S01 in FIG. 10.

FIG. 11 is a flowchart showing an example of the standby process of step S01 in FIG. 10.

The standby process includes the first control process executed by the first control unit 115g, the first detection process executed by the first detection unit 115h, and the acquisition process executed by the acquisition unit 111f.

First, a description will be given of the first control process executed by the first control unit 115g.

The first control unit 115g controls the switches SW10, SW11, SW12, and SW14 to close the electrical pathways (step S41). Next, the first control unit 115g controls the switch SW13 to open the electrical pathway (step S42). Then, the first control unit 115g controls the switch SW10 to open the electrical pathway for 0.01 ms, and controls the power supply circuit 116 to apply the voltage to the first conductive membrane 111b (step S43). The first control unit 115g controls the switch SW10 to close the electrical pathway (step S44).

Next, the first control unit 115g determines whether the input operation is detected by the execution of the first detection process (step S45). When the answer to the determination of step S45 is "YES", the first control unit 115g finishes executing the first control process.

When the answer to the determination of step S45 is "NO", the first control unit 115g controls the switch SW14 to open the electrical pathway for 0.01 ms, discharges the electrical charges of the first conductive membrane 111b, and sets the potential of the first conductive membrane 111b to the reference potential (step S46). Next, the first control unit 115g controls the switch SW14 to close the electrical pathway (step S47). Then, the first control unit 115g sleeps until next execution time (i.e., after about 0.98 ms) (step S48). The procedure returns to step S43, and the first control unit 115g repeats the procedures of steps S43 to S48.

Next, a description will be given of the first detection process executed by the first detection unit 115h.

First, the first detection unit 115h determines whether the potential AN1 of the first conductive membrane 111b acquired by the acquisition process is a low level (step S51).

When the answer to the determination of step S51 is "YES", the first detection unit 115h detects the input operation by detecting the current flowing from the first conductive membrane 111b to the second conductive membrane 112b (step S52). Then, the first detection unit 115h finishes executing the first detection process.

When the answer to the determination of step S51 is "NO", the first detection unit 115h sleeps until next execution time (i.e., after about 1 ms) (step S53). The procedure returns to step S51, and the first detection unit 115h repeats the determination of step S51.

The first detection unit 115h executes the step (i.e., step S52) in which the first detection unit 115h detects the current flowing from the first conductive membrane 111b, to which the voltage is applied by the first control process, to the second conductive membrane 112b in synchronization with the step (i.e., step S43) in which the first control unit 115g controls the power supply circuit 116 to apply the voltage to the first conductive membrane 111b.

With the configuration, the step (i.e., step S52) for detecting the current flowing from the first conductive membrane 111b to which the voltage is applied is executed in synchronization with the step (i.e., step S43) for applying the voltage to the first conductive membrane 111b, and hence an execution load by the execution unit 115a can be reduced, and the input operation can be detected at high speed.

Finally, a description will be given of the acquisition process executed by the acquisition unit 115f.

First, the acquisition unit 115f controls the switches SW10 and SW13 to open the electrical pathways (i.e., the switches SW10 and SW13 is "ON") (step S61). Next, the acquisition unit 115f controls the switches SW11, SW12, and SW14 to close the electrical pathways (i.e., the switches SW10 and SW13 is "OFF") (step S62). The acquisition unit 115f acquires a value of the potential AN1 of the first conductive membrane 111b from the ADC 114 (step S63). Then, the acquisition unit 115f transmits the value of the potential AN1 to the first detection unit 115h (step S64). Then, the present process is terminated.

Figure 12A:
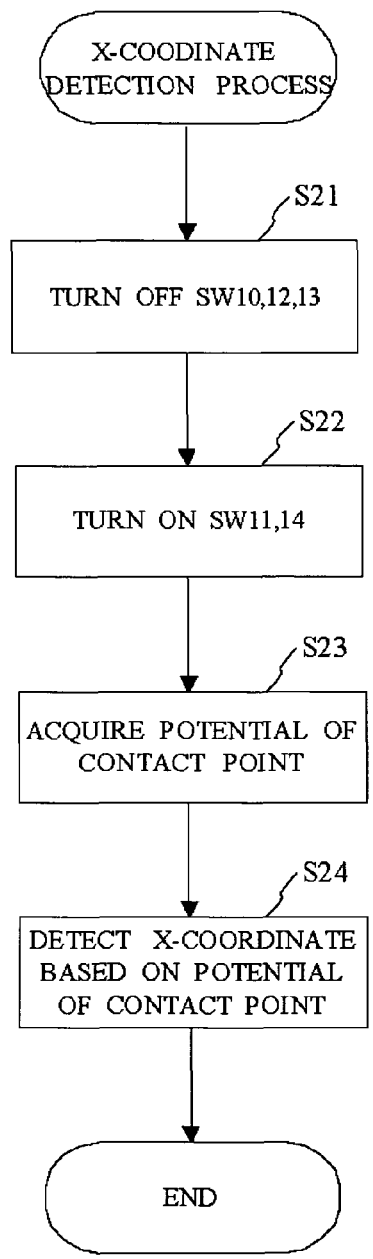
FIG. 12A is a flowchart showing an example of an X-coordinate detection process of step S03 in FIG. 10.

FIG. 12A is a flowchart showing an example of the X-coordinate detection process of step S03 in FIG. 10.

The second detection unit 115j controls the switches SW10, SW12, and SW13 to close the electrical pathways (step S21). Next, the second detection unit 115j controls the switches SW11 and SW14 to open the electrical pathways (step S22). Thereby, the voltage is applied to the first conductive membrane 111b. The voltage is the same as the voltage applied to the first conductive membrane 111b by the first control process. Then, the acquisition unit 115f acquires the potential AN2 representing the potential of the contact point PT1 (step S23). Next, the second detection unit 115j detects the X-coordinate of the input position based on the potential AN2 (step S24). The present process is terminated.

Figure 12B:
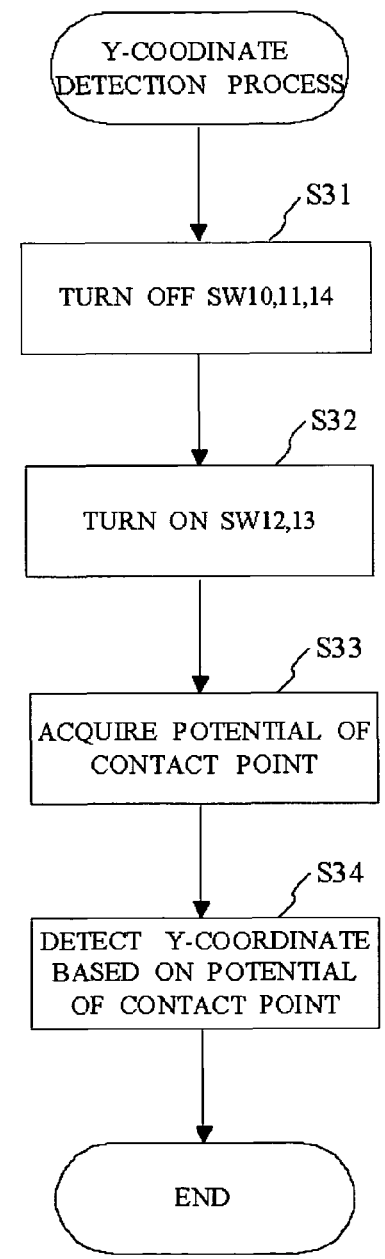
FIG. 12B is a flowchart showing an example of a Y-coordinate detection process of step S04 in FIG. 10.

FIG. 12B is a flowchart showing an example of the Y-coordinate detection process of step S04 in FIG. 10. The Y-coordinate detection process is substantively identical with the X-coordinate detection process, and hence a description thereof is omitted.

According to the X-coordinate detection process or the Y-coordinate detection process, the input position is detected by the voltage applied to the first conductive membrane 111b by the first control process, and hence the influence of a noise cannot be received easily and the input position can be detected with high accuracy (i.e., resolution can be improved), compared with the case where the input position is detected with another voltage (e.g. 1V DC). According to the X-coordinate detection process or the Y-coordinate detection process, even when the areas of the first substrate electrode 111 and the second substrate electrode 112 increase, the voltage applied to the first conductive membrane 111b can be enhanced, and hence the detection accuracy of the input position can be maintained or improved. According to the X-coordinate detection process or the Y-coordinate detection process, compared with the case where a power supply circuit that supplies a voltage used for the detection of the input position is added to the input detection device 10 in addition to the power supply circuit 116 that supplies the voltage used for the detection of the input operation, a power consumption can be reduced, the number of parts can be reduced, and hence the cost of the reduced parts can be reduced.

Although in the present embodiment, the input detection device 10 includes the ADC 114 and the switches SW10 to SW14 which are separated devices, the present embodiment is not limited to this. For example, the input detection device 10 may include an exclusive control IC incorporating the ADC 114 and the switches SW10 to SW14.

In the present embodiment, the execution unit 115a included in the input detection device 10 may be a CPU which is incorporated in an exclusive control IC, and is different from a conventional CPU incorporated in the touch panel as the input detection device 10. However, the present embodiment is not limited to this, and for example, the execution unit 115a may be the conventional CPU incorporated in the touch panel. With the configuration, compared with the case where the execution unit 115a is the CPU incorporated in the exclusive control IC, the number of parts can be reduced, and hence the cost of manufacturing of the input detection device 10 can be reduced. In this case, the execution unit 115a executes the input detection process in addition to a conventional process controlling the touch panel.

Second Embodiment

In a second embodiment, a description will be given of the input detection apparatus composed of a 5-lines touch panel. The 5-lines touch panel indicates a touch panel in which a leading line is drawn from the first substrate electrode, and four leading lines are drawn from the second substrate electrode.

Figure 13:
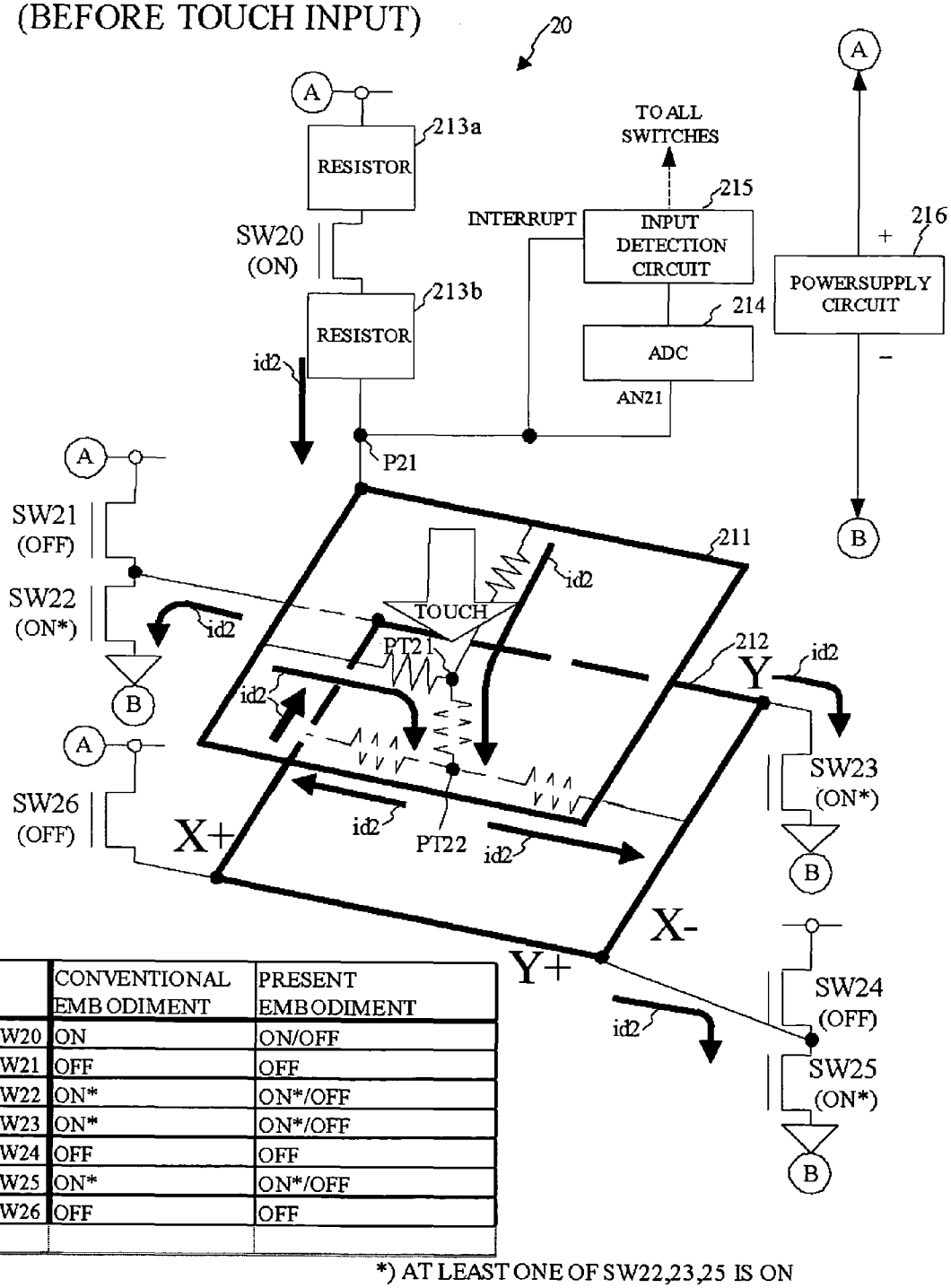
FIG. 13 is a diagram showing an example of the hardware configuration of an input detection apparatus 20 according to a second embodiment.

FIG. 13 is a diagram showing an example of the hardware configuration of an input detection apparatus 20 according to the second embodiment.

Similarly to the first embodiment, the input detection apparatus 20 according to the second embodiment includes a first substrate electrode 211, a second substrate electrode 212, an ADC 214, an input detection circuit 215, and a power supply circuit 216. The input detection apparatus 20 is different from the input detection apparatus 10 according to the first embodiment in that the input detection apparatus 20 includes switches SW20 to SW26, and resistors 213a and 213b. Therefore, a description will be mainly given of difference points between the input detection apparatus 20 according to the second embodiment and the input detection apparatus 10 according to the first embodiment.

Similarly to the switches 10 to 14 according to the first embodiment, each of the switches SW20 to SW26 is composed of the high-speed switching element such as the semiconductor switch. The switch SW20 is connected to a positive electrode of the power supply circuit 216 via the resistor 213a. The switches SW21 and SW24 are directly connected to the positive electrode of the power supply circuit 216. In addition, the switch SW20 is connected to the resistor 213b, the switch SW21 is connected to the second substrate electrode 212 and the switch 22, and the switch SW24 is connected to the second substrate electrode 212 and the switch 25. Therefore, when the switches SW20, SW21, and SW24 close the electrical pathways, a voltage is applied to electrodes and devices connected to the respective switches SW20, SW21, and SW24 by the power supply circuit 216.

The switches SW22, SW23 and SW25 are connected to a grounded negative electrode of the power supply circuit 216: Also, the switches SW22, SW23 and SW25 are connected to the second substrate electrode 212. Therefore, when the switches SW22, SW23 and SW25 close the electrical pathways, a reference potential is supplied to the second substrate electrode 212.

The first substrate electrode 211 is connected to the resistor 213b, the ADC 214, and the input detection circuit 215. The second substrate electrode 212 is connected to the switches SW21 to SW26. The first substrate electrode 211 includes four sides having a quadrangular conductive electrode. The quadrangular conductive electrode of the first substrate electrode 211 is connected to a point P21 via a leading line. The point P21 is connected to the ADC 214, the input detection circuit 215, and the positive electrode of the power supply circuit 216 via the resistors 213a and 213b and the switch 20.

The first substrate electrode 211 receives the input operation, and hence the load of mechanical distortion is large. Since the input detection apparatus 20 is the 5-lines touch panel, and the single leading line is drawn from the first substrate electrode 211, the decay durability of the input detection apparatus 20 can be improved.

The second substrate electrode 212 includes four sides having respective conductive electrodes. The switch SW26 is connected to one tip of the second substrate electrode 212. The switches SW21 and SW22 are connected to one of two tips adjacent to the tip to which the switch SW26 is connected, and the switches SW24 and SW25 are connected to other one of the two tips. Further, the switch SW23 is connected to a remaining tip.

The second substrate electrode 212 has a conductive electrode X+ on a side coupling between the tip connected to the switch SW21 and the tip connected to the switch SW26. Similarly, the second substrate electrode 212 has a conductive electrode X− on a side coupling between the tip connected to the switch SW23 and the tip connected to the switch SW25. Each of the four tips is connected to the corresponding switch via a single leading line.

The conductive electrode X+ is connected to the positive electrode of the power supply circuit 216 via the switches SW21 and SW26. The conductive electrode X− is connected to the negative electrode of the power supply circuit 216 via the switches SW23 and SW25. The second substrate electrode 212 has a conductive electrode Y+ on a side coupling between the tip connected to the switch SW24 and the tip connected to the switch SW26. Similarly, the second substrate electrode 212 has a conductive electrode Y− on a side coupling between the tip connected to the switch SW22 and the tip connected to the switch SW23. The conductive electrode Y+ is connected to the positive electrode of the power supply circuit 216 via the switches SW24 and SW26. The conductive electrode Y− is connected to the negative electrode of the power supply circuit 216 via the switches SW22 and SW23.

Similarly to the first embodiment, the first substrate electrode 211 is composed of a first substrate 211a and a first conductive membrane 211b. The four sides of the first conductive membrane 211b are connected to the quadrangular conductive electrode. Similarly to the first embodiment, the second substrate electrode 212 is also composed of a second substrate 212a and a second conductive membrane 212b. The four sides of second conductive membrane 212b are connected to the conductive electrodes X+, X−, Y+, and Y−.

Each of the resistors 213a and 213b has the same configuration as the resistor 113 in the first embodiment. The resistors 213a and 213b are connected to the switch SW20.

The resistor 213a is connected to the positive electrode of the power supply circuit 216. The resistor 213b is connected to the first substrate electrode 211, the ADC 214, and the input detection circuit 215. The resistors 213a and 213b limit an amount of a current that flows to the first substrate electrode 211.

The ADC 214 is connected to the first substrate electrode 211, the input detection circuit 215, and the resistor 213b. The ADC 214 converts an electrical potential AN21 of the conductive electrode included in the first substrate electrode 211 into a digital value, and outputs the digital value to the input detection circuit 215. In the coordinate detection time, the ADC 214 especially acquires potentials of contact points PT21 and PT22 of the first conductive membrane 212a and the second conductive membrane 212b.

To explain the potential of the contact point PT22 in the X-coordinate detection time, a description will be given of a current generated by the contact point PT22, with reference to FIG. 14.

Figure 14:
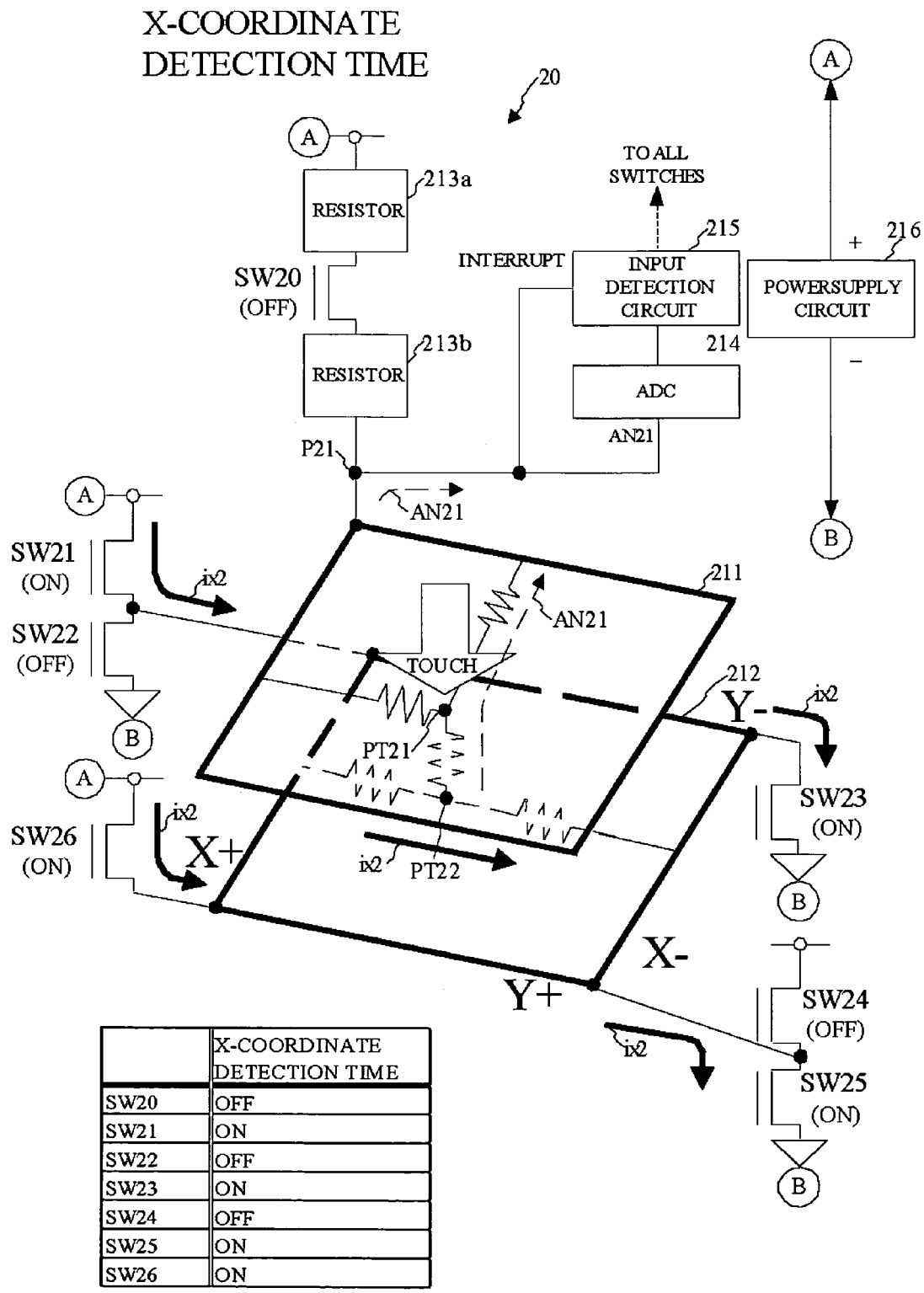
FIG. 14 is a diagram showing an example of a current generated by the input detection apparatus 20 in FIG. 13 in the X-coordinate detection time.

FIG. 14 is a diagram showing an example of a current generated by the input detection apparatus 20 in FIG. 13 in the X-coordinate detection time.

As shown in FIG. 14, the switches SW21, SW23, SW25, and SW26 open the electrical pathways in X-coordinate detection time. The switches SW20, SW22, and SW24 close the electrical pathways. Thereby, a current ix2 generated in the X-coordinate detection time flows from the positive electrode of the power supply circuit 216 to the conductive electrode X− of the second substrate electrode 212 via the switches SW21 and SW26 opening the electrical pathways, and the conductive electrode X+ of the second substrate electrode 212. The current ix2 passes the contact point PT22 located between the conductive electrodes X+ and X− of the second substrate electrode 212, and flows to the negative electrode of the power supply circuit 216 via the switches SW23 and SW25.

Here, similarly to the first embodiment, the ADC 214 acquires a potential AN21 of the contact points PT21 and PT22 from the electrical pathway passing the point P21. Similarly to the first embodiment, the input detection apparatus 20 detects the X-coordinate of the input position by using the potentials of the conductive electrodes X+ and X−, and the potential AN21 of the contact point PT22.

To explain the potential of the contact point PT22 in the Y-coordinate detection time, a description will be given of a current generated by the contact point PT22, with reference to FIG. 15.

Figure 15:
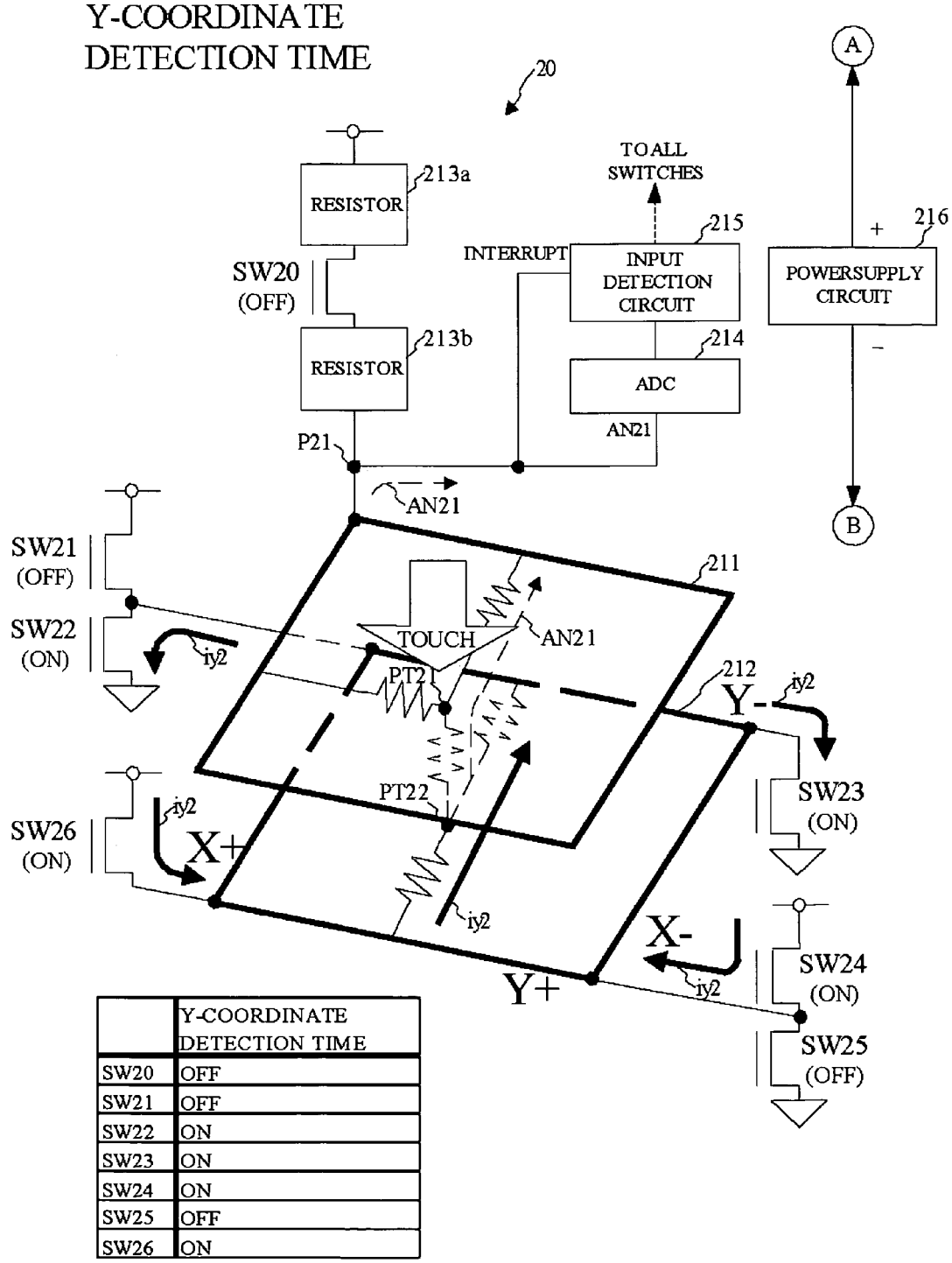
FIG. 15 is a diagram showing an example of a current generated by the input detection apparatus 20 shown in FIG. 13 in the Y-coordinate detection time.

FIG. 15 is a diagram showing an example of the current generated by the input detection apparatus 20 shown in FIG. 13 in the Y-coordinate detection time.

As shown in FIG. 15, the switches SW20, SW21, and SW25 close the electrical pathways in the Y-coordinate detection time. The switches SW20, SW21, and SW25 open the electrical pathways. Thereby, a current iy2 generated in the Y-coordinate detection time flows from the positive electrode of the power supply circuit 216 to the conductive electrode Y− of the second substrate electrode 212 via the switches SW24 and SW26 opening the electrical pathways, and the conductive electrode Y+ of the second substrate electrode 212. The current ix2 passes the contact point PT22 located between the conductive electrodes Y+ and Y− of the second substrate electrode 212, and flows to the negative electrode of the power supply circuit 216 via the switches SW22 and SW23.

Here, similarly to the X-coordinate detection time, the ADC 214 acquires the potential AN21 of the contact points PT21 and PT22 from the electrical pathway passing the point P21. Similarly to the X-coordinate detection time, the input detection apparatus 20 detects the Y-coordinate of the input position by using the potentials of the conductive electrodes Y+ and Y−, and the potential AN21 of the contact point PT22.

Referring again to FIG. 13, a description will be continuously given of the configuration of the input detection apparatus 20.

The positive electrode of the power supply circuit 216 is connected to the resistor 213a, and the switches SW21, SW24, and SW26. The negative electrode of the power supply circuit 216 is connected to the switches SW22, SW23, and SW25.

The input detection circuit 215 is connected to the first substrate electrode 211, the resistor 213b, the ADC 214, and the switches SW20 to SW26. Similarly to the first embodiment, the input detection circuit 215 is composed of an execution unit 215a, a ROM 215b, a RAM 215c, an IF unit 215d, and a bus 215e. The execution unit 215a has an interruption line coupling with the point P21.

Next, a description will be given of the functional configuration of the input detection circuit 215. Similarly to the first embodiment, the input detection circuit 215 includes an acquisition unit 215f, a first control unit 215g, a first detection unit 215h, a second control unit 215i, and a second detection unit 215j. The acquisition unit 215f acquires the potential AN21 of the first conductive membrane 211b from the ADC 214. Especially, the acquisition unit 215f acquires the potentials of the contact points PT21 and PT22 of the first conductive membrane 211b and the second conductive membrane 212b in the coordinate detection time. The first control unit 215g is connected to the switches SW20 to SW26. The first control unit 215g controls the switches SW20 to SW26 to open and close the electrical pathways.

In the input standby time, the first control unit 215g executes a first control process in which the first control unit 215g controls the power supply circuit 216 to intermittently apply the voltage to the first conductive membrane 211b included in the first substrate electrode 211.

Figure 16A:
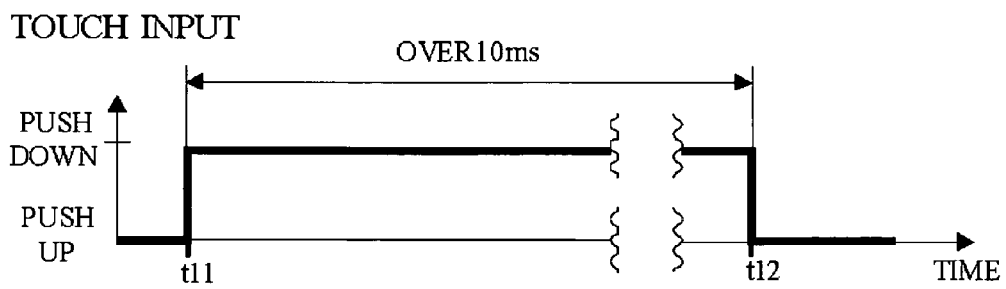
FIG. 16A is a diagram showing timing in which the touch pen comes in contact with a first substrate electrode 211 by an input operation.
Figure 16B:
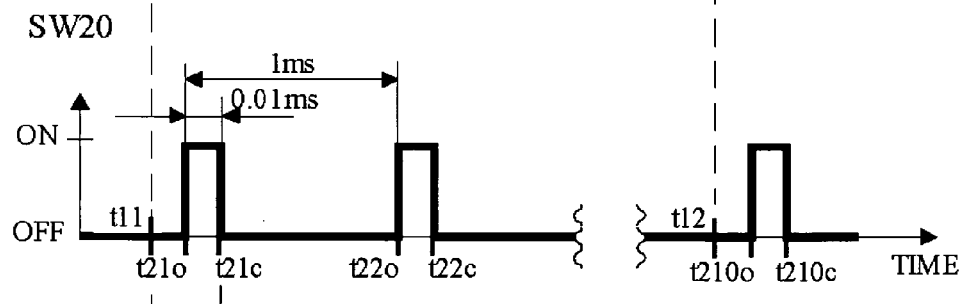
FIG. 16B is a diagram showing timing in which the first control unit 215g controls a switch SW20.
Figure 16C:
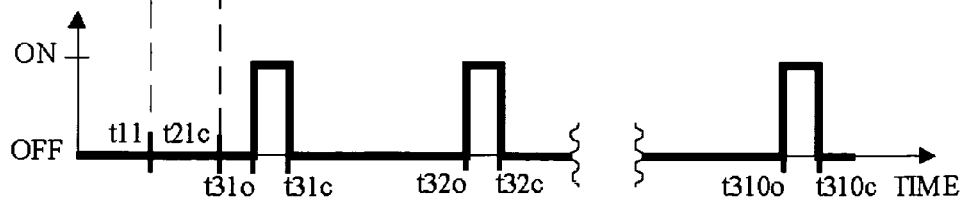
FIG. 16C is a diagram showing timing in which the first control unit 215g controls al least one of switches SW22, SW23, and SW25.

Here, a description will be given of control timing in which the first control unit 215g controls the switches SW20, SW22, SW23, and SW25, with reference to FIGS. 16A to 16C. FIGS. 16A to 16C show the control timing in which the first control unit 215g controls the switches SW20, SW22, SW23, and SW25.

FIG. 16A is a diagram showing timing in which the touch pen comes in contact with the first substrate electrode 211 by an input operation. FIG. 16B is a diagram showing timing in which the first control unit 215g controls the switch SW20. In FIG. 16B, the first control unit 215g controls the switch SW10 to open the electrical pathway during 0.01 ms, at intervals of 1 ms. By the control of the first control unit 215g, positive electrical charges are accumulated in the surface of the first conductive membrane 211b, and negative electrical charges are accumulated in the surface of the second conductive membrane 212b. FIG. 16C is a diagram showing timing in which the first control unit 215g controls al least one of switches SW22, SW23, and SW25. In FIG. 16C, the first control unit 215g controls al least one of switches SW22, SW23, and SW25 to open the electrical pathway during 0.01 ms, at intervals of 1 ms. By the control of the first control unit 215g, the positive electrical charges accumulated in the surface of the first conductive membrane 211b, and the negative electrical charges accumulated in the surface of the second conductive membrane 212b are discharged.

At start time t11 of the touch input as shown in FIGS. 16A to 16C, the first conductive membrane 211b and the second conductive membrane 212b discharges the electrical charges. Therefore, even when the first conductive membrane 211b comes in contact with the second conductive membrane 212b by the start of the touch input, the inrush current is not generated.

At the time t21o (i.e., time in which the switch SW20 is on) after the start time t11 of the touch input shown in FIG. 16B, a current id2, an amount of which is limited with the resistors 213a and 213b via the switch 20 opening the electrical pathway is generated on the first conductive membrane 211b and the second conductive membrane 212b. The first detection unit 215h detects the input operation by detecting the generation of the current id2.

That is, the first control process executed by the first control unit 215g indicates that the first control unit 215g controls the power supply circuit 216 to apply a voltage having a pulse width of 0.01 ms in the frequency of 1 KHz to the first conductive membrane 211b, similarly to the first embodiment. That is, in the first control process, the voltage whose duty ratio is 1% is applied to the first conductive membrane 211b.

With the configuration, the voltage is intermittently applied to the first conductive membrane 211b, and hence the probability of generation of the inrush current is reduced when the first conductive membrane 211b comes in contact with the second conductive membrane 212b. Therefore, the detection accuracy of the input operation can be improved by an increase in the applied voltage. Also, with the configuration, when the voltage is applied to the first conductive membrane 211b, the probability in which the first conductive membrane 211b comes in contact with the second conductive membrane 212b becomes equal to or less than 1%, and hence the probability of generation of the inrush current also becomes equal to or less than 1%. In addition, the probability of generation of the inrush current also becomes equal to or less than 1%, so that the damage probability of the first conductive membrane 211b and the second conductive membrane 212b by the inrush current becomes equal to or less than 1%. Thereby, the service life of the first conductive membrane 211b and the second conductive membrane 212b improves by two digits or more.

As described above, the first conductive membrane 211b and the second conductive membrane 212b are connected to the negative electrode of the power supply circuit 216 via the switches SW22, SW23 and SW25 opening the electrical pathways. Therefore, after the voltage is applied to the first conductive membrane 211b, the first control unit 215g controls the switches to set the potentials of the first conductive membrane 211b and the second conductive membrane 212b to a reference potential. With the configuration, the probability of generation of the inrush current can be reduced accurately.

As shown in FIG. 16A, the input operation is generally executed during 10 ms or more. It is therefore desirable that, in the first control process executed by the first control unit 215g, a voltage having a pulse width of 10 ms or less in the frequency of 100 MHz or more is applied to the first conductive membrane 211b. It is also desirable that, in the first control process executed by the first control unit 215g, a voltage having a pulse width of 0.001 ms or more in the frequency of 10 KHz or less is applied to the first conductive membrane 211b. However, the applied voltages are not limited to these. With the configuration, the input operation can be detected with certainty and high accuracy. Especially, when as shown in FIG. 16A, the normal input operation is executed during 10 ms or more, the detection accuracy of the input operation is notably improved in the time period.

When the first detection unit 215h detects the generation of the current continuously two times or more, the first detection unit 215h may detect the input operation. With the configuration, when the current flowing from the first conductive membrane 211b to the second conductive membrane 212b is detected continuously two times or more, the input operation is detected. Therefore, the detection accuracy of the input operation can be improved.

The second control unit 215i is connected to the switches SW20 to SW26. In the coordinate detection time, the second control unit 215i applies the same voltage as the standby state by using the power supply circuit 216, to the conductive electrodes X+ and Y+ of the second conductive membrane 212b. Specifically, in the X-coordinate detection time, the second control unit 215i controls the switches SW20, SW22, and SW24 to close the electrical pathways, and controls the switches SW21, SW23, SW25, and SW26 to open the electrical pathways. Similarly, in the Y-coordinate detection time, the second control unit 215i controls the switches SW20, SW21, and SW25 to close the electrical pathways, and controls the switches SW22, SW23, SW24, and SW26 to open the electrical pathways.

The second detection unit 215j detects coordinate value of the input position based on the potential AN21 of the contact point PT21 and PT22 which are acquired by the acquisition unit 215f and are decided by the voltage applied by the second detection unit 215j. Thereby, the input position is detected by using the voltage applied to the first conductive membrane 211b by the first control process, and hence the detection accuracy of the input position can be improved. According to the X-coordinate detection process or the Y-coordinate detection process, the input position is detected by the voltage applied to the first conductive membrane 211b by the first control process, and hence the influence of a noise cannot be received easily and the input position can be detected with high accuracy (i.e., resolution can be improved), compared with the case where the input position is detected with another voltage (e.g. 1V DC). According to the X-coordinate detection process or the Y-coordinate detection process, even when the areas of the first substrate electrode 211 and the second substrate electrode 212 increase, the voltage applied to the first conductive membrane 211b can be enhanced, and hence the detection accuracy of the input position can be maintained or improved. According to the X-coordinate detection process or the Y-coordinate detection process, compared with the case where a power supply circuit that supplies a voltage used for the detection of the input position is added to the input detection device 20 in addition to the power supply circuit 216 that supplies the voltage used for the detection of the input operation, a power consumption can be reduced, the number of parts can be reduced, and hence the cost of the reduced parts can be reduced.

Similarly to the first embodiment, the execution unit 215a executes a process in which the first detection unit 215h detects the current id2 flowing from the first conductive membrane 211b, to which the voltage is applied by the first control process, to the second conductive membrane 212b in synchronization with a process in which the first control unit 215g controls the power supply circuit 216 to apply the voltage to the first conductive membrane 211b.

With the configuration, the process for detecting the current flowing from the first conductive membrane 211b to which the voltage is applied is executed in synchronization with the process for applying the voltage to the first conductive membrane 211b, and hence an execution load by the execution unit 215a can be reduced, and the input operation can be detected at high speed.

Similarly to the first embodiment, at least one of the first conductive membrane 211b and the second conductive membrane 212b is composed of a transparent conductive polymer. Since the transparent conductive polymer has flexibility and decay durability, and is a low cost, the detection accuracy of the input operation can be improved for a long term, and the cost of manufacturing of the input detection apparatus 20 can be reduced.

Similarly to the first embodiment, the transparent conductive polymer is composed of a conductive polymer material in a polythiophene system. With the configuration, it is possible to prevent a conductive capability of the conductive polymer material in the polythiophene system from being lost by the inrush current. Especially, in the conductive polymer material in the polythiophene system, the conduction is hindered by the inrush current. Therefore, even when a specific part of the first substrate electrode 211 is operated many times by the input operation, the damage probability in the specific parts of the first conductive membrane 211b and the second conductive membrane 212b can be reduced. As a result, the conduction between the electrodes can be maintained over a long period of time, and the input operation can be detected over a long period of time.

Third Embodiment

In a third embodiment, a description will be given of the input detection apparatus composed of a 7-lines touch panel. The 7-lines touch panel indicates a touch panel in which a leading line is drawn from the first substrate electrode, and four leading lines and two monitoring lines are drawn from the second substrate electrode.

Figure 17:
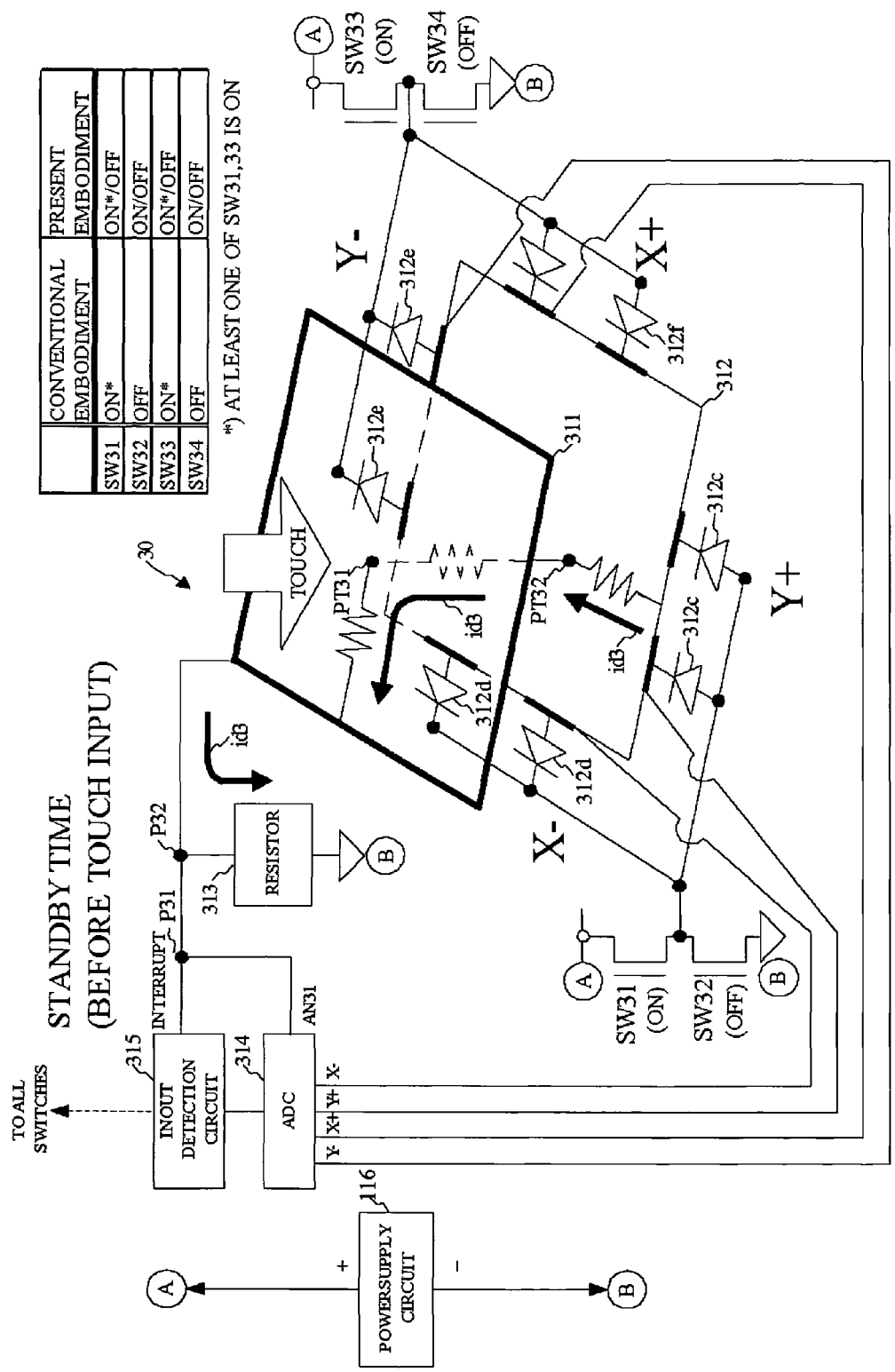
FIG. 17 is a diagram showing an example of the hardware configuration of an input detection apparatus 30 according to a third embodiment.

FIG. 17 is a diagram showing an example of the hardware configuration of an input detection apparatus 30 according to the third embodiment.

Similarly to the first embodiment, the input detection apparatus 30 according to the third embodiment includes a first substrate electrode 311, a second substrate electrode 312, a resistor 313, an ADC 314, an input detection circuit 315, and a power supply circuit 316. The input detection apparatus 30 is different from the input detection apparatus 10 according to the first embodiment in that the input detection apparatus 30 includes switches SW31 to SW34, and rectifiers 312c to 312f. Therefore, a description will be mainly given of difference points between the input detection apparatus 30 according to the third embodiment and the input detection apparatus 10 according to the first embodiment.

Similarly to the switches 10 to 14 according to the first embodiment, each of the switches SW31 to SW34 is composed of the high-speed switching element such as the semiconductor switch. The switches SW31 and SW33 are connected to a positive electrode of the power supply circuit 316. The switch SW31 is connected to the rectifiers 312c and 312d, and switch SW32. The switch SW33 is connected to the rectifiers 312f and 312e, and switch SW34. Therefore, when the switches SW31 and SW33 close the electrical pathways, a voltage is applied to the rectifiers 312c to 312f by the power supply circuit 316.

The switches SW32 and SW34 are connected to a grounded negative electrode of the power supply circuit 316. The switch SW32 is connected to the rectifiers 312c and 312d, and switch SW31. Also, the switch SW34 is connected to the rectifiers 312e and 312f, and switch SW33. Therefore, when the switches SW32 and SW34 close the electrical pathways, a reference-voltage is supplied to the rectifiers 312c to 312f.

The first substrate electrode 311 is connected to the resistor 313, the ADC 314, and the input detection circuit 315. The second substrate electrode 312 is connected to the rectifiers 312c to 312f. The first substrate electrode 311 includes four sides having a quadrangular conductive electrode. The quadrangular conductive electrode of the first substrate electrode 311 is connected to a point P32 via a leading line. The point P32 is connected to the ADC 314, the input detection circuit 315, and the negative electrode of the power supply circuit 316 via the resistor 313.

The second substrate electrode 312 includes four sides, and at least one conductive electrode X+ is formed on at least one part provided on a side. At least one conductive electrode X− is formed on at least one part provided on a side opposite to the side having the conductive electrode X+. At least one conductive electrode Y+ is formed on at least one part provided on a side which is different from the sides having the conductive electrodes X+ and X−. At least one conductive electrode Y− is formed on at least one part provided on a remaining side.

Similarly to the first embodiment, the first substrate electrode 311 is composed of a first substrate 311a and a first conductive membrane 311b. The four sides of the first conductive membrane 311b are connected to the quadrangular conductive electrode. Similarly to the first embodiment, the second substrate electrode 312 is also composed of a second substrate 312a and a second conductive membrane 312b. The four sides of second conductive membrane 312b are connected to the conductive electrodes X+, X−, Y+, and Y−, respectively. The conductive electrodes X+, X−, Y+, and Y− are connected to the rectifiers 312f, 312d, 312c, 312e, respectively.

Each of the rectifiers 312c to 312f is composed of a diode such as a PN diode. The rectifiers 312c and 312d are connected to switches SW31 and SW32 via a single leading line L1. The rectifiers 312e and 312f are connected to switches SW33 and SW34 via a single leading line L2. The rectifiers 312c to 312f are connected to ADC 314 monitoring the respective potentials thereof via the monitoring lines L3. The rectifiers 312c and 312f let the current flow from the switches to the second substrate electrode 312, and the rectifiers 312d and 312e let the current flow from the switches to the second substrate electrode 312.

The resistor 313 has the same configuration as the resistor 113 in the first embodiment. The resistor 313 is connected to the first substrate electrode 311, the ADC 314, and the input detection circuit 315. The resistor 313 is also connected to the negative electrode of the power supply circuit 316. The resistor 313 limits an amount of the current that flows to the first substrate electrode 311.

The ADC 314 is connected to the conductive electrode included in the first substrate electrode 311 via a leading line, connected to the rectifiers 312c to 312f via the four monitoring lines L3 to thereby monitor the potentials of the conductive electrodes X+, X−, Y+, and Y− included in the second substrate electrode 312, and connected to the input detection circuit 315 and the resistor 313. The ADC 314 converts the potential AN of the conductive electrode included in the first substrate electrode 311, and the potentials of the conductive electrodes X+, X−, Y+, and Y− included in the second substrate electrode 312 into digital values, and outputs the digital values to the input detection circuit 315.

Especially, in the coordinate detection time, the ADC 314 acquires the potentials of contact points PT31 and PT32 of the first conductive membrane 311b and the second conductive membrane 312b.

Next, a description will be given of the potential of the contact point PT32 in the X-coordinate detection time.

In the X-coordinate detection time, the switches SW31 and SW34 close the electrical pathways, and the switches SW32 and SW33 open the electrical pathways. Thereby, a current ix3 generated in the touch input flows from the positive electrode of the power supply circuit 316 to the conductive electrode X− of the second substrate electrode 312 via the switch SW32 opening the electrical pathway, and the conductive electrode X+ of the second substrate electrode 312, by a rectification.

The current ix3 passes the contact point PT32 located between the conductive electrodes X+ and X− of the second substrate electrode 312, and flows to the negative electrode of the power supply circuit 316 via the switch SW32. Therefore, similarly to the first embodiment, the ADC 314 acquires the potential AN31 of the contact points PT31 and PT32 from the electrical pathway passing the point P31, in the X-coordinate detection time.

Next, a description will be given of the potential of the contact point PT32 in the Y-coordinate detection time.

In the Y-coordinate detection time, the switches SW32 and SW33 close the electrical pathways, and the switches SW31 and SW34 open the electrical pathways. Thereby, a current iy3 generated in the touch input flows from the positive electrode of the power supply circuit 316 to the conductive electrode Y− of the second substrate electrode 312 via the switch SW31 opening the electrical pathway, and the conductive electrode Y+ of the second substrate electrode 312, by the rectification.

The current iy3 passes the contact point PT32 located between the conductive electrodes Y+ and Y− of the second substrate electrode 312, and flows to the negative electrode of the power supply circuit 316 via the switch SW34. Therefore, similarly to the first embodiment, the ADC 314 acquires the potential AN31 of the contact points PT31 and PT32 from the electrical pathway passing the point P31, in the Y-coordinate detection time.

A description will be given of the power supply circuit 316 before a description of the input detection circuit 315.

The positive electrode of the power supply circuit 316 is connected to switches SW31 and SW33. The negative electrode of the power supply circuit 316 is connected to the switches SW32 and SW34, and the resistor 313.

The input detection circuit 315 is connected to the first substrate electrode 311, the ADC 314, and the switches SW31 to SW34, and the resistor 313. Similarly to the first embodiment, the input detection circuit 315 is composed of an execution unit 315a, a ROM 315b, a RAM 315c, an IF unit 315d, and a bus 315e. The execution unit 315a has an interruption line coupling with the point P31.

Next, a description will be given of the functional configuration of the input detection circuit 315. Similarly to the first embodiment, the input detection circuit 315 includes an acquisition unit 315f, a first control unit 315g, a first detection unit 315h, a second control unit 315i, and a second detection unit 315j. The acquisition unit 315f acquires the potential AN31 of the conductive electrode included in the first conductive membrane 311b, and the potentials of the conductive electrodes X+, X−, Y+, and Y− of the first conductive membrane 311b, from the ADC 314. Especially, the acquisition unit 315f acquires the potentials of the contact points PT31 and PT32 of the first conductive membrane 311b and the second conductive membrane 312b in the coordinate detection time. The first control unit 315g is connected to the switches SW31 to SW34. The first control unit 315g controls the switches SW31 to SW34 to open and close the electrical pathways.

In the input standby time, the first control unit 315g executes a first control process in which the first control unit 315g controls the power supply circuit 316 to intermittently apply the voltage to the second conductive membrane 312b included in the second substrate electrode 312.

Figure 18A:
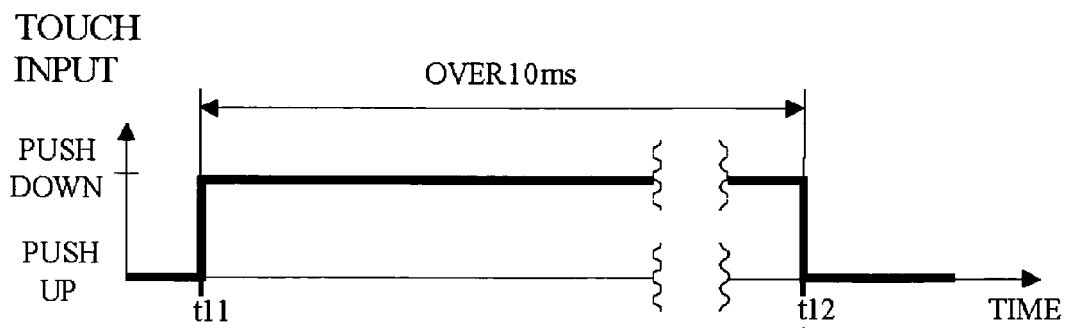
FIG. 18A is a diagram showing timing in which the touch pen comes in contact with a first substrate electrode 311 by an input operation.
Figure 18B:
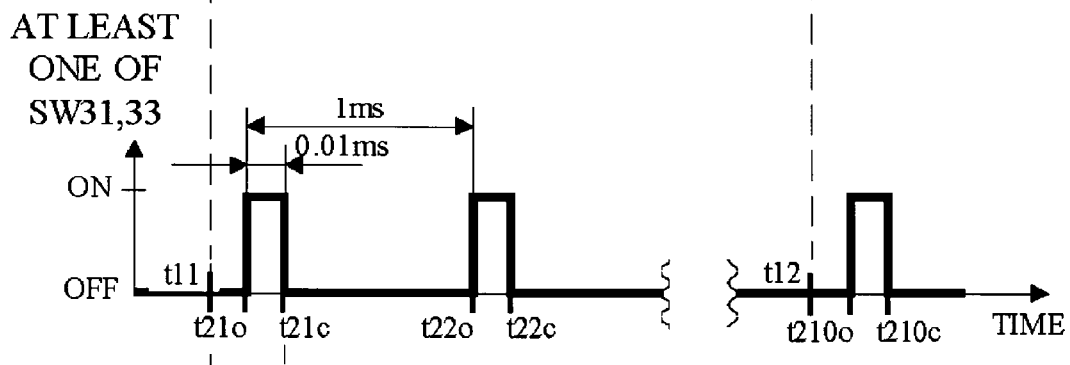
FIG. 18B is a diagram showing timing in which a first control unit 315g controls any one of switches SW31 and SW33.
Figure 18C:
FIG. 18C is a diagram showing timing in which the first control unit 315g controls both of switches SW32 and SW34.

Here, a description will be given of control timing in which the first control unit 315g controls the switches SW31 to SW34, with reference to FIGS. 18A to 18C. FIGS. 18A to 18C show the control timing in which the first control unit 315g controls the switches SW31 to SW34.

FIG. 18A is a diagram showing timing in which the touch pen comes in contact with the first substrate electrode 311 by the input operation. FIG. 18B is a diagram showing timing in which the first control unit 315g controls any one of the switches SW31 and SW33. In FIG. 18B, the first control unit 315g controls any one of the switches SW31 and SW33 to open the electrical pathways during 0.01 ms, at intervals of 1 ms. By the control of the first control unit 315g, negative electrical charges are accumulated in the surface of the first conductive membrane 311b, and positive electrical charges are accumulated in the surface of the second conductive membrane 312b.

FIG. 18C is a diagram showing timing in which the first control unit 315g controls both of the switches SW32 and SW34. In FIG. 18C, the first control unit 315g controls both of the switches SW32 and SW34 to open the electrical pathways during 0.01 ms, at intervals of 1 ms. By the control of the first control unit 315g, the negative electrical charges accumulated in the surface of the first conductive membrane 311b, and the positive electrical charges accumulated in the surface of the second conductive membrane 312b are discharged. At start time t11 of the touch input as shown in FIGS. 18A to 18C, the first conductive membrane 311b and the second conductive membrane 312b discharges the electrical charges. Therefore, even when the first conductive membrane 311b comes in contact with the second conductive membrane 312b by the start of the touch input, the inrush current is not generated.

At the time t21o (i.e., time in which any one of the switches SW31 and SW33 is on) after the start time t11 of the touch input shown in FIG. 18B, a current id3, an amount of which is limited with the resistor 313 via any one of the switches SW31 and SW33 opening the electrical pathways is generated on the first conductive membrane 311b and the second conductive membrane 312b. The first detection unit 315h detects the input operation by detecting the generation of the current id3.

That is, the first control process executed by the first control unit 315g indicates that the first control unit 315g controls the power supply circuit 316 to apply a voltage having a pulse width of 0.01 ms in the frequency of 1 KHz to the second conductive membrane 312b, similarly to the first embodiment. That is, in the first control process, the voltage whose duty ratio is 1% is applied to the second conductive membrane 312b.

With the configuration, the voltage is intermittently applied to the second conductive membrane 312b, and hence the probability of generation of the inrush current is reduced when the first conductive membrane 311b comes in contact with the second conductive membrane 312b. Therefore, the detection accuracy of the input operation can be improved by an increase in the applied voltage. Also, with the configuration, when the voltage is applied to the second conductive membrane 312b, the probability in which the first conductive membrane 311b comes in contact with the second conductive membrane 312b becomes equal to or less than 1%, and hence the probability of generation of the inrush current also becomes equal to or less than 1%. In addition, the probability of generation of the inrush current also becomes equal to or less than 1%, so that the damage probability of the first conductive membrane 311b and the second conductive membrane 312b by the inrush current becomes equal to or less than 1%. Thereby, the service life of the first conductive membrane 311b and the second conductive membrane 312b improves by two digits or more.

As described above, the first conductive membrane 311b and the second conductive membrane 312b are connected to the resistor 313 and the negative electrode of the power supply circuit 316 via the switches SW32 and SW34 opening the electrical pathways. Therefore, after the voltage is applied to the second conductive membrane 312b, the first control unit 315g controls the switches to set the potentials of the first conductive membrane 311b and the second conductive membrane 312b to a reference potential, similarly to the first embodiment. With the configuration, the probability of generation of the inrush current can be reduced accurately.

As shown in FIG. 18A, the input operation is generally executed during 10 ms or more. Similarly to the first embodiment, it is therefore desirable that, in the first control process executed by the first control unit 315g, a voltage having a pulse width of 10 ms or less in the frequency of 100 MHz or more is applied to the second conductive membrane 312b.

Similarly to the first embodiment, it is also desirable that, in the first control process executed by the first control unit 315g, a voltage having a pulse width of 0.001 ms or more in the frequency of 10 KHz or less is applied to the second conductive membrane 312b. However, the applied voltages are not limited to these. With the configuration, the input operation can be detected with certainty and high accuracy. Especially, when as shown in FIG. 18A, the normal input operation is executed during 10 ms or more, the detection accuracy of the input operation is notably improved in the time period.

When the first detection unit 315h detects the generation of the current continuously two times or more, similarly to the first embodiment, the first detection unit 315h may detect the input operation. With the configuration, when the current flowing from the first conductive membrane 311b to the second conductive membrane 312b is detected continuously two times or more, the input operation is detected. Therefore, the detection accuracy of the input operation can be improved.

The second control unit 315i is connected to the switches SW31 to SW34. In the coordinate detection time, the second control unit 315i applies the same voltage as the standby state by using the power supply circuit 316, to the conductive electrodes X+ and Y+ of the second conductive membrane 312b. Specifically, in the X-coordinate detection time, the second control unit 315i controls the switches SW31 and SW34 to close the electrical pathways, and controls the switches SW32 and SW33 to open the electrical pathways. Similarly, in the Y-coordinate detection time, the second control unit 315i controls the switches SW32 and SW33 to close the electrical pathways, and controls the switches SW31 and SW34 to open the electrical pathways.

The second detection unit 315j detects coordinate value of the input position based on the potential AN31 of the contact point PT31 and PT32 which are acquired by the acquisition unit 315f and are decided by the voltage applied by the second detection unit 315j. Thereby, the input position is detected by using the voltage applied to the second conductive membrane 312b by the first control process, and hence the detection accuracy of the input position can be improved. According to the X-coordinate detection process or the Y-coordinate detection process, the input position is detected by the voltage applied to the second conductive membrane 312b by the first control process, and hence the influence of a noise cannot be received easily and the input position can be detected with high accuracy (i.e., resolution can be improved), compared with the case where the input position is detected with another voltage (e.g. 1V DC). According to the X-coordinate detection process or the Y-coordinate detection process, even when the areas of the first substrate electrode 311 and the second substrate electrode 312 increase, the voltage applied to the second conductive membrane 312b can be enhanced, and hence the detection accuracy of the input position can be maintained or improved. According to the X-coordinate detection process or the Y-coordinate detection process, compared with the case where a power supply circuit that supplies a voltage used for the detection of the input position is added to the input detection device 30 in addition to the power supply circuit 316 that supplies the voltage used for the detection of the input operation, a power consumption can be reduced, the number of parts can be reduced, and hence the cost of the reduced parts can be reduced.

Similarly to the first embodiment, the execution unit 315a executes a process in which the first detection unit 315h detects the current id3 flowing from the second conductive membrane 312b, to which the voltage is applied by the first control process, to the first conductive membrane 311b in synchronization with a process in which the first control unit 315g controls the power supply circuit 316 to apply the voltage to the second conductive membrane 312b.

With the configuration, the process for detecting the current flowing from the second conductive membrane 312b to which the voltage is applied is executed in synchronization with the process for applying the voltage to the second conductive membrane 312b, and hence an execution load by the execution unit 315a can be reduced, and the input operation can be detected at high speed.

Similarly to the first embodiment, at least one of the first conductive membrane 311b and the second conductive membrane 312b is composed of a transparent conductive polymer. Since the transparent conductive polymer has flexibility and decay durability, and is a low cost, the detection accuracy of the input operation can be improved for a long term, and the cost of manufacturing of the input detection apparatus 30 can be reduced.

Similarly to the first embodiment, the transparent conductive polymer is composed of a conductive polymer material in a polythiophene system. With the configuration, it is possible to prevent a decay capability of the conductive polymer material in the polythiophene system from being lost by the inrush current. Especially, in the conductive polymer material in the polythiophene system, the conduction is hindered by the inrush current. Therefore, even when a specific part of the first substrate electrode 311 is operated many times by the input operation, the damage probability in the specific parts of the first conductive membrane 311b and the second conductive membrane 312b can be reduced. As a result, the conduction between the electrodes can be maintained over a long period of time, and the input operation can be detected over a long period of time.

Although in the present embodiment, the first control unit 315g controls both of the switches SW32 and SW34 to intermittently open the electrical pathways, this is not limitative, but the first control unit 315g may control any one of the switches SW32 and SW34 to intermittently open the electrical pathway.

Programs indicative of processes executed by the execution units 115a, 215a, and 315a included in the respective input detection circuits 115, 215, and 315 may be stored into a recording medium such as a magnetic disk, an optical disk, and a semiconductor memory, and the recording medium may be distributed. The programs also may be distributed via a network.

It should be noted that the present invention is not limited to the embodiment, and various modifications may be made to them without departing from the scope of the invention.

The Present application is based on Japanese Patent Application No. 2008-183236 filed Jul. 14, 2008, the entire disclosure of which is hereby incorporated by reference.

What is claimed is:

1. An input detection circuit comprising:
   an acquisition portion that acquires at least one potential of a first conductive membrane formed on a first surface of a first substrate, and a second conductive membrane formed on a second surface of a second substrate provided at a position away from the first substrate, the second surface being opposed to the first conductive membrane;
   a first control portion that selectively controls switches connected to the first conductive membrane and the second conductive membrane to periodically apply a voltage to the first conductive membrane at intervals shorter than a time period of a normal input operation, at least one switch of the switches being connected to the first conductive membrane and at least one other switch of the switches being connected the second conductive membrane; and
   a first detection portion that detects an input operation by detecting the generation of a current that flows from the first conductive membrane to which the voltage is applied by the first control portion, to the second conductive membrane based on the potential acquired by the acquisition portion.

2. The input detection circuit as claimed in claim 1, wherein when the first control portion controls the switches, the first detection portion detects the input operation at the same time.

3. The input detection circuit as claimed in claim 1, wherein when the current is detected continuously two times or more, the first detection portion detects the input operation.

4. The input detection circuit as claimed in claim 1, wherein when the voltage is applied to the first conductive membrane, the first control portion sets at least one potential of the first conductive membrane and the second conductive membrane to a reference potential.

5. The input detection circuit as claimed in claim 1, wherein at least one of the first conductive membrane and the second conductive membrane is composed of a transparent conductive polymer.

6. The input detection circuit as claimed in claim 5, wherein the transparent conductive polymer is composed of a conductive polymer material in a polythiophene system.

7. The input detection circuit as claimed in claim 1, wherein the acquisition portion acquires a potential of a contact point between the first conductive membrane and the second conductive membrane, and
the input detection circuit further comprising:
a second control portion that controls the switches connected to the first conductive membrane or the second conductive membrane to apply the voltage to a part of any one of the first conductive membrane and the second conductive membrane; and
a second detection portion that detects input position of the input operation based on the potential of the contact point acquired by the acquisition portion, and a potential of the part of any one of the first conductive membrane and the second conductive membrane, the potential of the contact point being decided by the voltage applied by the second control portion.

8. The input detection circuit as claimed in claim 1, wherein detecting the generation of the current that flows from the first conductive membrane is executed in synchronization with periodically applying the voltage to the first conductive membrane.

9. An input detection method comprising:
acquiring at least one potential of a first conductive membrane formed on a first surface of a first substrate, and a second conductive membrane formed on a second surface of a second substrate provided at a position away from the first substrate, the second surface being opposed to the first conductive membrane;
selectively controlling switches connected to the first conductive membrane and the second conductive membrane to periodically apply a voltage to the first conductive membrane at intervals shorter than a time period of a normal input operation, at least one switch of the switches being connected to the first conductive membrane and at least one other switch of the switches being connected the second conductive membrane; and
detecting an input operation by detecting the generation of a current that flows from the first conductive membrane to which the voltage is applied, to the second conductive membrane based on the acquired potential.

10. The input detection method as claimed in claim 9, wherein detecting the generation of the current that flows from the first conductive membrane is executed in synchronization with periodically applying the voltage to the first conductive membrane.

11. A non-transitory computer readable medium causing a computer to execute a process, the process comprising:
acquiring at least one potential of a first conductive membrane formed on a first surface of a first substrate, and a second conductive membrane formed on a second surface of a second substrate provided at a position away from the first substrate, the second surface being opposed to the first conductive membrane;
selectively controlling switches connected to the first conductive membrane and the second conductive membrane to periodically apply a voltage to the first conductive membrane at intervals shorter than a time period of a normal input operation, at least one switch of the switches being connected to the first conductive membrane and at least one other switch of the switches being connected the second conductive membrane; and
detecting an input operation by detecting the generation of a current that flows from the first conductive membrane to which the voltage is applied, to the second conductive membrane based on the acquired potential.

12. The non-transitory computer readable as claimed in claim 11, wherein detecting the generation of the current that flows from the first conductive membrane is executed in synchronization with periodically applying the voltage to the first conductive membrane.

13. An input detection apparatus comprising:
a first conductive membrane formed on a first surface of a first substrate;
a second conductive membrane formed on a second surface of a second substrate provided at a position away from the first substrate, the second surface being opposed to the first conductive membrane; and
an input detection circuit including:
an acquisition portion that acquires at least one potential of the first conductive membrane and the second conductive membrane;
a first control portion that selectively controls switches connected to the first conductive membrane and the second conductive membrane to periodically apply a voltage to the first conductive membrane at intervals shorter than a time period of a normal input operation, at least one switch of the switches being connected to the first conductive membrane and at least one other switch of the switches being connected the second conductive membrane; and
a first detection portion that detects an input operation by detecting the generation of a current that flows from the first conductive membrane to which the voltage is applied by the first control portion, to the second conductive membrane based on the potential acquired by the acquisition portion.

14. The input detection apparatus as claimed in claim 13, wherein when the first control portion controls the switches, the first detection portion detects the input operation at the same time.

15. The input detection apparatus as claimed in claim 13, wherein when the current is detected continuously two times or more, the first detection portion detects the input operation.

16. The input detection apparatus as claimed in claim 13, wherein when the voltage is applied to the first conductive membrane, the first control portion sets at least one potential of the first conductive membrane and the second conductive membrane to a reference potential.

17. The input detection apparatus as claimed in claim 13, wherein at least one of the first conductive membrane and the second conductive membrane is composed of a transparent conductive polymer.

18. The input detection apparatus as claimed in claim 17, wherein the transparent conductive polymer is composed of a conductive polymer material in a polythiophene system.

19. The input detection apparatus as claimed in claim 13, wherein the acquisition portion acquires a potential of a contact point between the first conductive membrane and the second conductive membrane, and
the input detection circuit further comprising:
a second control portion that controls the switches connected to the first conductive membrane or the second conductive membrane to apply the voltage to a part of any one of the first conductive membrane and the second conductive membrane; and a second detection portion that detects input position of the input operation based on the potential of the contact point acquired by the acquisition portion, and a potential of the part of any one of the first conductive membrane and the second conductive membrane, the potential of the contact point being decided by the voltage applied by the second control portion.

20. The input detection apparatus as claimed in claim 13, wherein detecting the generation of the current that flows from the first conductive membrane is executed in synchronization with periodically applying the voltage to the first conductive membrane.

* * * * *